US008146007B2

(12) United States Patent
Ramamoorthy et al.

(10) Patent No.: US 8,146,007 B2
(45) Date of Patent: *Mar. 27, 2012

(54) CONVERTING A FIRST GRAPHICAL PROGRAM INTO AN INTERMEDIATE ABSTRACT REPRESENTATION FOR NEW GRAPHICAL PROGRAM GENERATION

(75) Inventors: Subramanian Ramamoorthy, Austin, TX (US); Lothar Wenzel, Round Rock, TX (US); Gregory O. Morrow, Austin, TX (US); Michael L. Santori, Austin, TX (US); John C. Limroth, Austin, TX (US); Ram Kudukoli, Austin, TX (US); Robert E. Dye, Austin, TX (US)

(73) Assignee: National Instruments Corporation, Austin, TX (US)

( * ) Notice: Subject to any disclaimer, the term of this patent is extended or adjusted under 35 U.S.C. 154(b) by 436 days.

This patent is subject to a terminal disclaimer.

(21) Appl. No.: 12/411,297

(22) Filed: Mar. 25, 2009

(65) Prior Publication Data

US 2009/0183094 A1 Jul. 16, 2009

Related U.S. Application Data

(63) Continuation of application No. 11/930,784, filed on Oct. 31, 2007, which is a continuation of application No. 10/978,995, filed on Nov. 1, 2004, now Pat. No. 7,340,684, which is a continuation of application No. 09/742,510, filed on Dec. 20, 2000, now Pat. No. 7,043,693, which is a continuation-in-part of application No. 09/518,492, filed on Mar. 3, 2000, now Pat. No. 7,159,183.

(60) Provisional application No. 60/149,942, filed on Aug. 19, 1999.

(51) Int. Cl.
*G06F 3/00* (2006.01)
*G06F 3/048* (2006.01)

(52) U.S. Cl. .......... 715/762; 715/763; 715/764
(58) Field of Classification Search .......... 715/762–764, 715/771, 715, 967; 709/201, 203
See application file for complete search history.

(56) References Cited

U.S. PATENT DOCUMENTS 5,291,587 A 3/1994 Kodosky et al.
(Continued)

FOREIGN PATENT DOCUMENTS

EP 0 817 035 1/1998

OTHER PUBLICATIONS

Online web page, VisSim/SIMULINK Translator, dated May 13, 2002, 1 pg.

(Continued)

*Primary Examiner* — Tadeese Hailu
(74) *Attorney, Agent, or Firm* — Meyertons Hood Kivlin Kowert & Goetzel, P.C.; Jeffrey C. Hood; Joel L. Stevens

(57) ABSTRACT

System and method for programmatically generating a second graphical program associated with a second programming development environment based on a first graphical program associated with a first programming development environment. The second graphical program may be generated programmatically, without relying on user input, or may prompt for user input to determine various options to use in generating the second graphical program. The second graphical program may implement the functionality of, or a portion of the functionality of, the first graphical program. The method preferably generates the second graphical program such that the second programming development environment is operable to treat the second graphical program identically to a graphical program interactively developed by a user using the second programming development environment. Thus, once the second graphical program has been generated, the user may use the second programming development environment to edit the second graphical program, execute the second graphical program, etc.

86 Claims, 20 Drawing Sheets

U.S. PATENT DOCUMENTS

| | | | |
|---|---|---|---|
| 5,481,741 | A | 1/1996 | McKaskle et al. |
| 5,732,277 | A | 3/1998 | Kodosky et al. |
| 5,842,204 | A | 11/1998 | Andrews et al. |
| 5,966,532 | A | 10/1999 | McDonald et al. |
| 6,053,951 | A * | 4/2000 | McDonald et al. ........... 717/109 |
| 6,118,448 | A | 9/2000 | McMillan et al. |
| 6,212,672 | B1 | 4/2001 | Keller et al. |
| 6,219,628 | B1 | 4/2001 | Kodosky et al. |
| 6,234,799 | B1 | 5/2001 | Lin |
| 6,437,805 | B1 | 8/2002 | Sojoodi et al. |
| 6,453,464 | B1 | 9/2002 | Sullivan |

OTHER PUBLICATIONS

Online web page, Technical Computing Magazine, "VisSim Makes the Link", May 15, 2002, 4 pgs.

"LabVIEW™ User Manual"; National Instruments Corporation; Jan. 1998; pp. 2-1-2-23 and 22-1-22-5; Austin, TX, U.S.A.

"BridgeVIEW™ and LabVIEW™ G Programming Reference Manual"; National Instruments Corporation; Jan. 1998; pp. 21-1-21-11; Austin, TX, U.S.A.

Massimiliano Poletto, Wilson C. Hsieh, Dawson R. Engler and M Frans Kaashoek, "C and tcc: A Language and Compiler for Dynamic Code Generation"; ACM Transactions on Programming Languages and Systems; Mar. 1999; pp. 324-369; vol. 21, No. 2.

European search report for application No. EP 00 11 7301 mailed Apr. 12, 2006.

Orlando Loques, Julius Leite and Enrique Vinicio Carrera E.; "P-RIO: A Modular Parallel-Programming Environment"; IEEE Concurrency; Jan.-Mar. 1998; pp. 47-56.

* cited by examiner

CONVERTING A FIRST GRAPHICAL PROGRAM INTO AN INTERMEDIATE ABSTRACT REPRESENTATION FOR NEW GRAPHICAL PROGRAM GENERATION

CONTINUATION DATA

This application is a continuation of U.S. patent application Ser. No. 11/930,784 titled "Automatically Generating a Second Graphical Program Based on a First Graphical Program" filed on Oct. 31, 2007, whose inventors are Subramanian Ramamoorthy, Lothar Wenzel, Gregory O. Morrow, Michael L. Santori, John C. Limroth, Ram Kudukoli, and Robert E. Dye, which is a continuation of U.S. patent application Ser. No. 10/978,995 titled "System and Method for Programmatically Generating a Second Graphical Program Based on a First Graphical Program" filed Nov. 1, 2004, whose inventors are Subramanian Ramamoorthy, Lothar Wenzel, Gregory O. Morrow, Michael L. Santori, John C. Limroth, Ram Kudukoli, and Robert E. Dye, now U.S. Pat. No. 7,340,684, which is a continuation of U.S. patent application Ser. No. 09/742,510 titled "System and Method for Programmatically Generating a Second Graphical Program Based on a First Graphical Program" filed Dec. 20, 2000, whose inventors are Subramanian Ramamoorthy, Lothar Wenzel, Gregory O. Morrow, Michael L. Santori, John C. Limroth, Ram Kudukoli, and Robert E. Dye, now U.S. Pat. No. 7,043,693, which is a continuation-in-part of U.S. patent application Ser. No. 09/518,492 titled "System and Method for Programmatically Creating a Graphical Program", filed Mar. 3, 2000, whose inventors were Ram Kudukoli, Robert Dye, Melanie Jensen, and Yumiko Kawachi, now U.S. Pat. No. 7,159,183, which claims benefit of priority of U.S. provisional Patent Application Ser. No. 60/149,942 titled "System and Method for Programmatically Creating a Graphical Program" and filed Aug. 19, 1999, and which are all hereby incorporated by reference in their entirety as though fully and completely set forth herein.

FIELD OF THE INVENTION

The present invention relates to the field of graphical programming, and more particularly to a system and method for programmatically generating a second graphical program based on a first graphical program, wherein the second graphical program implements at least a portion of the functionality of the first graphical program.

DESCRIPTION OF THE RELATED ART

Traditionally, high level text-based programming languages have been used by programmers in writing application programs. Many different high level programming languages exist, including BASIC, C, Java, FORTRAN, Pascal, COBOL, ADA, APL, etc. Programs written in these high level languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, mathematical steps or other procedures customarily used to conceptually model a process often does not closely correspond to the traditional text-based programming techniques used to program a computer system to model such a process. In other words, the requirement that a user program in a text-based programming environment places a level of abstraction between the users conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, Java, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. The diagram may have one or more of data flow, control flow and/or execution flow representations. In response to the user constructing a diagram or graphical program using the block diagram editor, data structures may be automatically constructed which characterize an execution procedure which corresponds to the displayed procedure. The graphical program may be compiled or interpreted by a computer.

Therefore, Kodosky et al teaches a graphical programming environment wherein a user places or manipulates icons and interconnects or "wires up" the icons in a block diagram using a block diagram editor to create a graphical "program." A graphical program for measuring, controlling, or modeling devices, such as instruments, processes or industrial automation hardware, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation and numerical analysis, as well as for any type of general programming.

In creating a graphical program, a user may create a front panel or user interface panel. The front panel may include various user interface elements or front panel objects, such as controls and/or indicators, that represent or display the respective input and output that will be used by the graphical program or VI, and may include other icons which represent devices being controlled. The front panel may be comprised in a single window of user interface elements, or may comprise a plurality of individual windows each having a user interface element, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel objects, e.g., the GUI, may be embedded in the block diagram.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using front panel controls. This input data may propagate through the data flow block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, or just the output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, machine vision applications, and motion control, among others.

Many different graphical programming environment applications are in use today, including LabVIEW, DasyLab, and Diadem from National Instruments, Simulink from The MathWorks, and VEE from Agilent, among many others. The process of developing a graphical program in various graphical programming environments is similar in many ways. For example, as described above, the user typically creates a block diagram including various nodes and/or programmatic structures. However, the programs developed in these various programming environments may differ in many aspects. For example, the various nodes available for inclusion in a block diagram may differ from one environment to another. Thus, a graphical program developed using a particular programming environment may be said to be "associated" with that programming environment. Typically, it is not possible to use a first graphical program associated with a first programming environment in a second programming environment. In other words, the second programming environment cannot be used to perform tasks such as editing, executing, or debugging the first graphical program.

Thus, in order to use the first graphical program in the second programming environment, the first graphical program needs to be translated into a second graphical program associated with the second programming environment. In other words, a second graphical program must be created, wherein the second graphical program implements the functionality of the first graphical program. However, in the prior art, there is no system and method for automatically creating the second graphical program based on the first graphical program. In order to port a graphical program to a new graphical programming environment, users are currently forced to manually create a new graphical program associated with the new graphical programming environment. This typically entails recreating the block diagram of the original graphical program, e.g., to use nodes and programming conventions available in the new graphical programming environment. This can be a difficult, time-consuming, and error-prone task, especially when a large number of graphical programs must be ported to the new programming environment. Thus, a system and method to automate this process are desired.

SUMMARY OF THE INVENTION

One embodiment of the present invention comprises a system and method for programmatically generating a second graphical program based on a first graphical program. The first graphical program may be associated with a first programming environment. For example, a user may have interactively created the first graphical program from within the first programming environment, e.g., by using an editor to place and connect various nodes on a block diagram, such that the interconnected nodes visually indicate functionality of the first graphical program. The method may operate to automatically, i.e., programmatically, generate a second graphical program based on the first graphical program, such that the second graphical program is associated with a second programming environment. The method may generate the second graphical program programmatically, without relying on user input, or using some user input. For example, the system may prompt for user input to determine various options to use in automatically generating the second graphical program.

The second graphical program may implement the functionality of, or a portion of the functionality of, the first graphical program. The method preferably generates the second graphical program such that the second programming environment is operable to treat the second graphical program identically to a graphical program interactively developed by a user using the second programming environment. Thus, once the second graphical program has been generated, the user may use the second programming environment to edit the second graphical program, execute the second graphical program, etc.

In the preferred embodiment, the method receives information specifying the first graphical program, examines the information, and generates the second graphical program based on the information. The information specifying the first graphical program may be the first graphical program itself, e.g., may be the data structures or files that comprise the first graphical program. For example, during creation of the first graphical program, the first programming environment typically creates one or more files or data structures which specify or comprise the first graphical program. In various embodiments, these files may comprise text and/or binary information. The method may receive the information specifying the first graphical program from one or more of these files. For example, the information may include information specifying a set of nodes comprised in the first graphical program, interconnections among these nodes, programmatic structures such as loops comprised in the first graphical program, etc. The information may also include information specifying a user interface for the first graphical program.

In various embodiments, the information specifying the first graphical program may be received in any of various formats or file types, e.g., depending on the particular programming environment used to create the first graphical program. For example, the information may include information received from one or more binary files specifying various data structures which the first programming environment uses to directly represent the first graphical program. In another embodiment, the information may include abstract information describing the first graphical program, e.g., abstract information stored in a text file which the first programming environment is operable to generate. For example, such abstract information may fully specify the first graphical program, but the first programming environment may also maintain other files which allow the first programming environment to more efficiently manipulate the first graphical program, e.g., when editing or compiling the program.

In the preferred embodiment, the method is operable to analyze the received information specifying the first graphical program in order to construct an abstract representation of the first graphical program. In other words, one or more data structures representing the first graphical program may be programmatically constructed based on the received information. Once the abstract representation of the first graphical program has been constructed, the method may programmatically generate the second graphical program, using this representation.

The method may generate the second graphical program programmatically, without relying on user input, or may prompt for user input to determine various options to use in generating the second graphical program. For example, in various embodiments the user may specify options such as whether to generate the second graphical program so that it resembles the first graphical program as closely as possible, e.g., in the layout and interconnections among block diagram nodes, or whether to perform optimizations or modifications where possible or necessary, e.g., to facilitate downloading the second graphical program to a hardware device for execution.

The user may also be prompted for information enabling various aspects of the first graphical program to be translated. For example, the first graphical program may include functionality not natively supported by the programming environment of the second graphical program or may include functionality for which the method lacks the necessary knowledge to translate. Thus, the user may be prompted to specify equivalent functionality to be included in the second graphical program, e.g., by specifying one or more nodes supported by the second graphical program's programming environment or by specifying an external code module with which the second graphical program can interface, such as a DLL or other type of module, wherein the external code module implements the functionality.

In other embodiments, the user may specify any of various other types of information, e.g., to specify a file name(s) for the second graphical program, to specify options affecting the appearance of the user interface for the second graphical program, etc.

As described above, the method may construct an abstract representation of the first graphical program and may use this representation in programmatically generating the second graphical program. In one embodiment, the first graphical program is abstractly represented as a directed graph. For example, the method may operate to construct an adjacency list representing one or more of data flow, control flow, and/or execution flow among block diagram nodes.

In some cases, the first graphical program may utilize programming techniques not supported by the programming environment of the second graphical program. Thus the method may alter the abstract representation of the first graphical program as necessary to account for such differences or may take these differences into account when the second graphical program is generated. For example, the Simulink programming environment supports the use of loops among block diagram node interconnections, but the LabVIEW programming environment does not. Thus, when translating a Simulink program that includes such a loop to a LabVIEW program, a directed graph representation of the Simulink program may be created and analyzed for the existence of loops. If loops are detected, the loops may be removed, e.g., by using a LabVIEW local variable node to implement equivalent functionality without using a loop.

In one embodiment, a script specifying the creation of the second graphical program may be automatically created, based on the abstract representation of the first graphical program. This script may facilitate the programmatic creation of the second graphical program. For example, in one embodiment the script may comprise a list of operations for creating block diagram nodes of the appropriate types and having appropriate sizes and positions within the block diagram, another list of operations for wiring the block diagram nodes together, etc. The second graphical program may then be programmatically generated, based on the script. For example, in one embodiment each operation of the script may have an equivalent application programming interface (API) call that may be executed. By executing API calls specified by the script, the second graphical program may be programmatically created. In another embodiment, script operations may not have a one-to-one correspondence with API calls, but multiple API calls may be performed to perform each script operation.

As described above, the second graphical program may be associated with a second programming environment. The method may create the second graphical program in any of various ways. In one embodiment, the second programming environment provides an application programming interface (API) that may be used to programmatically create the second graphical program. For example, for each node, user interface element, or other object of the second graphical program, the API may be called to programmatically add the object to the second graphical program, connect the object to other objects of the second graphical program, etc.

Depending on the functionality and implementation of the first graphical program, the programmatically generated second graphical program may be a fully working program that implements the entire functionality of the first graphical program. In this case, the user can execute the second graphical program in the second programming environment, and the second graphical program will perform identically with or substantially like the first graphical program. In this case, the user can execute the second graphical program in the second programming environment, and the second graphical program will perform identically with or substantially like the first graphical program. However, in some cases, it may not be desirable or possible to create a fully identical and/or fully working second graphical program. For example, the second programming environment may not support certain functionality used in the first graphical program. In this case, the user may need to alter or complete the second graphical program before executing it. For example, the second programming environment may allow the user to link the second graphical program with an external code module which implements missing functionality.

In various embodiments, the system and method may be utilized to port graphical programs from any of various first programming environments to any of various second programming environments. The first and second graphical programs may utilize one or more of data flow, control flow, and execution flow. In one embodiment, the system and method may be used to automatically generate a LabVIEW program from a Simulink program. The Simulink programming environment is operable to create a textual "model file" that describes a Simulink graphical program. The method may receive this model file and parse the file to construct a directed graph data structure abstractly representing the Simulink graphical program. The method may then utilize an API supported by the LabVIEW programming environment to programmatically generate a LabVIEW program that implements at least a portion of the functionality of the Simulink program.

LabVIEW provides support to download LabVIEW programs to hardware devices such as FPGA's and other programmable logic devices, e.g., for execution in an embedded system. LabVIEW also provides support to download LabVIEW programs to an embedded memory for execution by an embedded processor executing a real time operating system, thus supporting more deterministic performance. The programming environment of the first graphical program may not support downloading the first graphical program to a hardware device or may not support the desired hardware device. Thus, in one embodiment, a second graphical program that is generated based on a first graphical program may be executed in a computing environment in which the first graphical program cannot execute.

BRIEF DESCRIPTION OF THE DRAWINGS

A better understanding of the present invention can be obtained when the following detailed description of the preferred embodiment is considered in conjunction with the following drawings, in which.

Figure 1A:
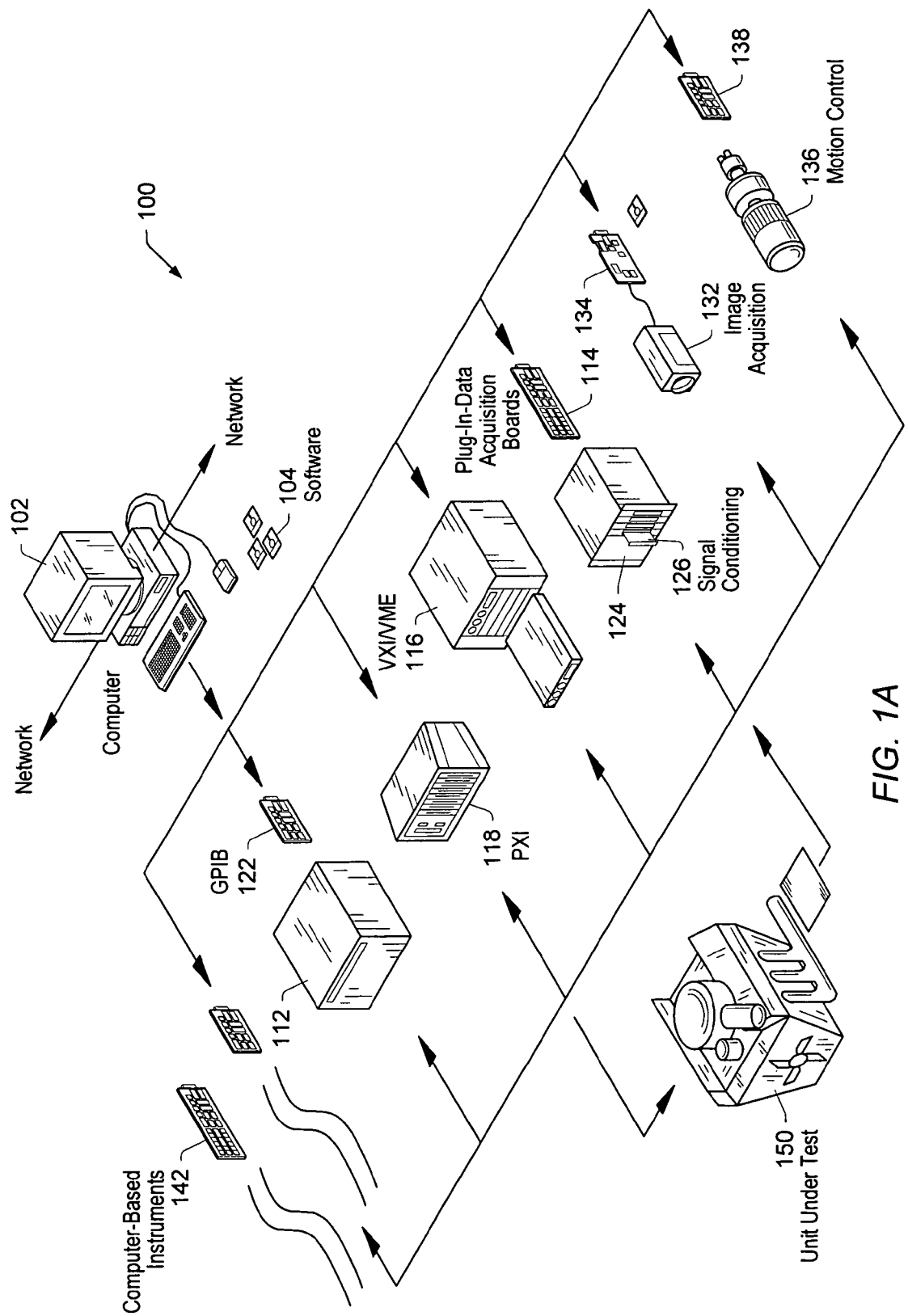
FIGS. 1A and 1B illustrate representative instrumentation and process control systems including various I/O interface options.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following reference is hereby incorporated by reference in its entirety as though fully and completely set forth herein:

U.S. Pat. No. 5,481,741 titled "Method and Apparatus for Providing Attribute Nodes in a Graphical Data Flow Environment," issued on Jan. 2, 1996.

U.S. Pat. No. 7,210,117, filed as application Ser. No. 09/745,023 titled "System and Method for Programmatically Generating a Graphical Program in Response to Program Information" filed on Dec. 20, 2000, whose inventors were Ram Kudukoli, Robert Dye, Paul F. Austin, Lothar Wenzel, and Jeffrey L. Kodosky.

U.S. Pat. No. 7,159,183, filed as application Ser. No. 09/518,492 titled "System and Method for Programmatically Creating a Graphical Program" filed on Mar. 3, 2000, whose inventors were Ram Kudukoli, Robert Dye, Melanie Jensen, and Yumiko Kawachi.

U.S. patent application Ser. No. 09/595,003 titled "System and Method for Automatically Generating a Graphical Program to Implement a Prototype" filed on Jun. 13, 2000, whose inventors were Nicolas Vazquez, Jeffrey L. Kodosky, Ram Kudukoli, Kevin L. Schultz, Dinesh Nair, and Christophe Caltagirone.

U.S. Pat. No. 6,173,438, filed as application Ser. No. 08/912,445 titled "Embedded Graphical Programming System" filed on Aug. 18, 1997, whose inventors were Jeffrey L. Kodosky, Darshan Shah, Samson DeKey, and Steve Rogers.

U.S. Pat. No. 6,219,628, filed as application Ser. No. 08/912,427 titled "System and Method for Converting Graphical Programs Into Hardware Implementations" filed on Aug. 18, 1997, whose inventors were Jeffrey L. Kodosky, Hugo Andrade, Brian Keith Odom, and Cary Paul Butler.

Figure 1B:
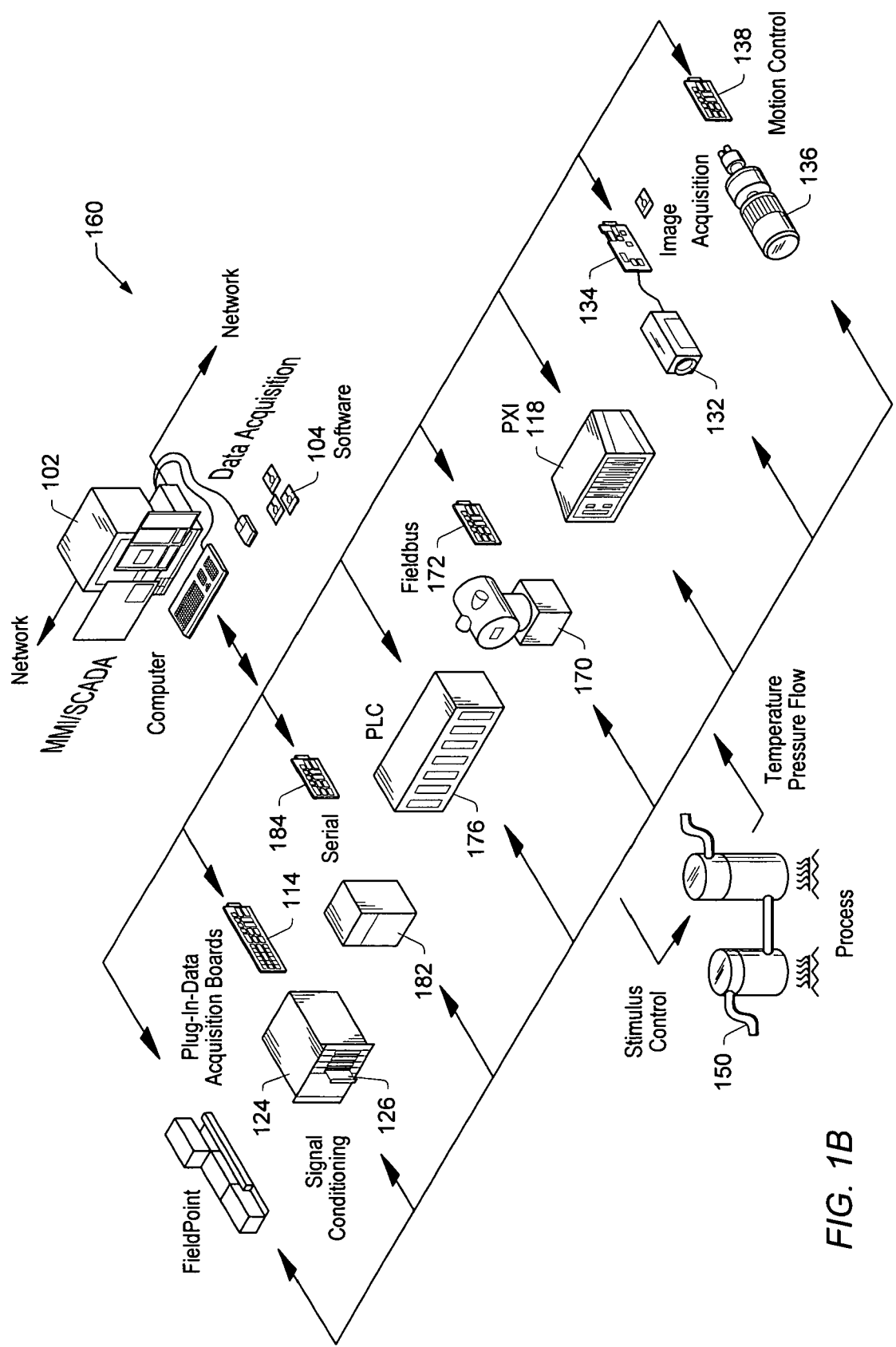

FIGS. 1A and 1B—Instrumentation and Industrial Automation Systems

Graphical programs may execute on any of various types of computer systems and may perform or control any of various types of operations, processes, or computations. In one embodiment, a graphical program may be utilized to perform an instrumentation application, such as a test and measurement or industrial automation application. FIGS. 1A and 1B illustrate exemplary systems for performing instrumentation applications and automation applications. An exemplary computer 102 having various types of instruments or hardware devices connected is illustrated. In various embodiments, the computer 102 may be any of various types of computer systems.

As described below, one embodiment of the present invention comprises a system and method for programmatically generating a second graphical program based on a first graphical program. In FIGS. 1A and 1B, the first graphical program and/or the second graphical program may execute on the computer 102. Also, the second graphical program may be downloaded to a hardware device connected to the computer 102 and may execute within the hardware device. For example, the second graphical program may be generated in association with a programming development environment operable to download the second graphical program to the hardware device for execution.

The first graphical program may be associated with a first programming development environment application, and the second graphical program may be associated with a second different programming development environment application. The computer-implemented method to programmatically generate the second graphical program may be implemented in either of the first or second programming development environment applications or may be implemented in a separate software program which executes on the computer 102 or another computer, such as a computer connected to the computer 102 via a network.

It is noted that FIGS. 1A and 1B are exemplary, and the present invention may be used with any of various types of computer systems. For example, in various embodiments, the first graphical program, the second graphical program, and/or the software that programmatically generates the second graphical program may execute on any of various types of computer systems and for any of various applications.

FIG. 1A illustrates an exemplary instrumentation control system 100. The system 100 comprises a host computer 102 which connects to one or more instruments. The host computer 102 may comprise a CPU, a display screen, memory, and one or more input devices such as a mouse or keyboard as shown. The computer 102 connects through the one or more instruments to analyze, measure, or control a unit under test (UUT) or process 150.

The one or more instruments may include one or more of a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 102 via the GPIB interface card 122 comprised in the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and may interface through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI chassis or instrument 116 may be coupled to the computer 102 via a VXI bus, MXI (e.g., MXI-3) bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102.

In typical instrumentation control systems an instrument will not be present of each interface type, and in fact many systems may only have one or more instruments of a single interface type, such as only GPIB instruments. The one or more instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 1B illustrates an exemplary industrial automation system 160. The industrial automation system 160 is similar to the instrumentation or test and measurement system 100 shown in FIG. 1A. Elements which are similar or identical to elements in FIG. 1A have the same reference numerals for convenience. The system 160 may comprise a computer 102 which connects to one or more devices or instruments. The computer 102 may comprise a CPU, a display screen, memory, and one or more input devices such as a mouse or keyboard as shown. The computer 102 may connect through the one or more devices to a process or device 150 to perform an automation function, such as MMI (Man Machine Interface), SCADA (Supervisory Control and Data Acquisition), portable or distributed data acquisition, process control, advanced analysis, or other control.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, USB, or IEEE 1394 or 1394.2 provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 1A and 1B, the computer system(s) 102 preferably includes a memory medium(s) on which software according to one embodiment of the present invention is stored. For example, the memory medium may store a first graphical program created in a first graphical programming development environment. The memory medium may also store a program, also referred to herein as a "graphical program generation (GPG) program" that is executable to programmatically generate a second graphical program based on the first graphical program. The same or a different memory medium may also store a second graphical programming development environment application, e.g., to execute or edit the second graphical program. It is noted that various of these software programs may be stored on different computer systems.

The term "memory medium" is intended to include an installation medium, e.g., a CD-ROM, floppy disks 104, or tape device, a computer system memory or random access memory such as DRAM, SRAM, EDO RAM, Rambus RAM, etc., or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer provides the program instructions to the first computer for execution. Also, the computer system 102 may take various forms, including a personal computer system, mainframe computer system, workstation, network appliance, Internet appliance, personal digital assistant (PDA), television system, programmable logic device, or other device. In general, the term "computer system" can be broadly defined to encompass any device having at least one processor that executes instructions from a memory medium.

Figure 2:
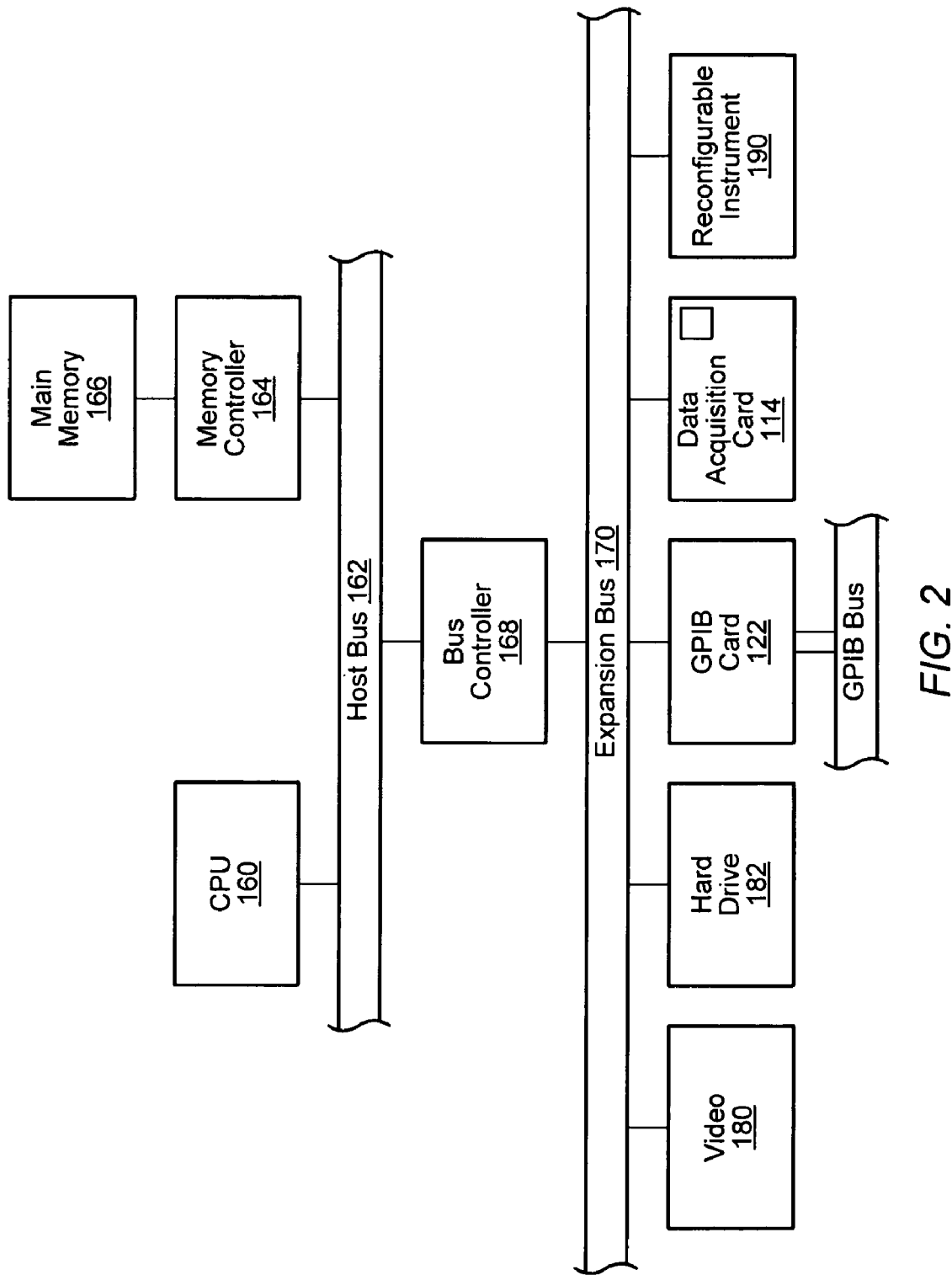
FIG. 2 is an exemplary block diagram of the computer systems illustrated in FIGS. 1A and 1B.

FIG. 2—Computer System Block Diagram

FIG. 2 is an exemplary block diagram of the computer systems illustrated in FIGS. 1A and 1B. It is noted that any type of computer system configuration or architecture can be used as desired, and FIG. 2 illustrates a representative PC embodiment. It is also noted that the computer system may be a general purpose computer system as shown in FIGS. 1A and 1B, a computer implemented on a VXI card installed in a VXI chassis, a computer implemented on a PXI card installed in a PXI chassis, or other types of embodiments. The elements of a computer not necessary to understand the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store software according to one embodiment of the present invention. The main memory 166 also stores operating system software as well as the software for operation of the computer system, as well known to those skilled in the art. The methods performed by the computer programs of the present invention will be discussed in more detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 1A) and a GPIB interface card 122 which provides a GPIB bus interface to the GPIB instrument 112 (of FIG. 1A). The computer 102 further comprises a video display subsystem 180 and hard drive 182 coupled to the expansion bus 170.

As shown, a reconfigurable instrument 190 may also be connected to the computer 102. The reconfigurable instrument 190 may include configurable logic, such as a programmable logic device (PLD), e.g., an FPGA, or a processor and memory, which may execute a real time operating system. According to one embodiment of the invention, a second graphical program programmatically generated based on a first graphical program may be downloaded and executed on the reconfigurable instrument 190. For example, the graphical programming development environment with which the second graphical program is associated may provide support for downloading a graphical program for execution on configurable logic in a real time system. In various embodiments, the configurable logic may be comprised on an instrument or device connected to the computer through means other than an expansion slot, e.g., the instrument or device may be connected via an IEEE 1394 bus, USB, or other type of port. Also, the configurable logic may be comprised on a device such as the data acquisition board 114 or another device shown in FIG. 1A.

Figure 3:
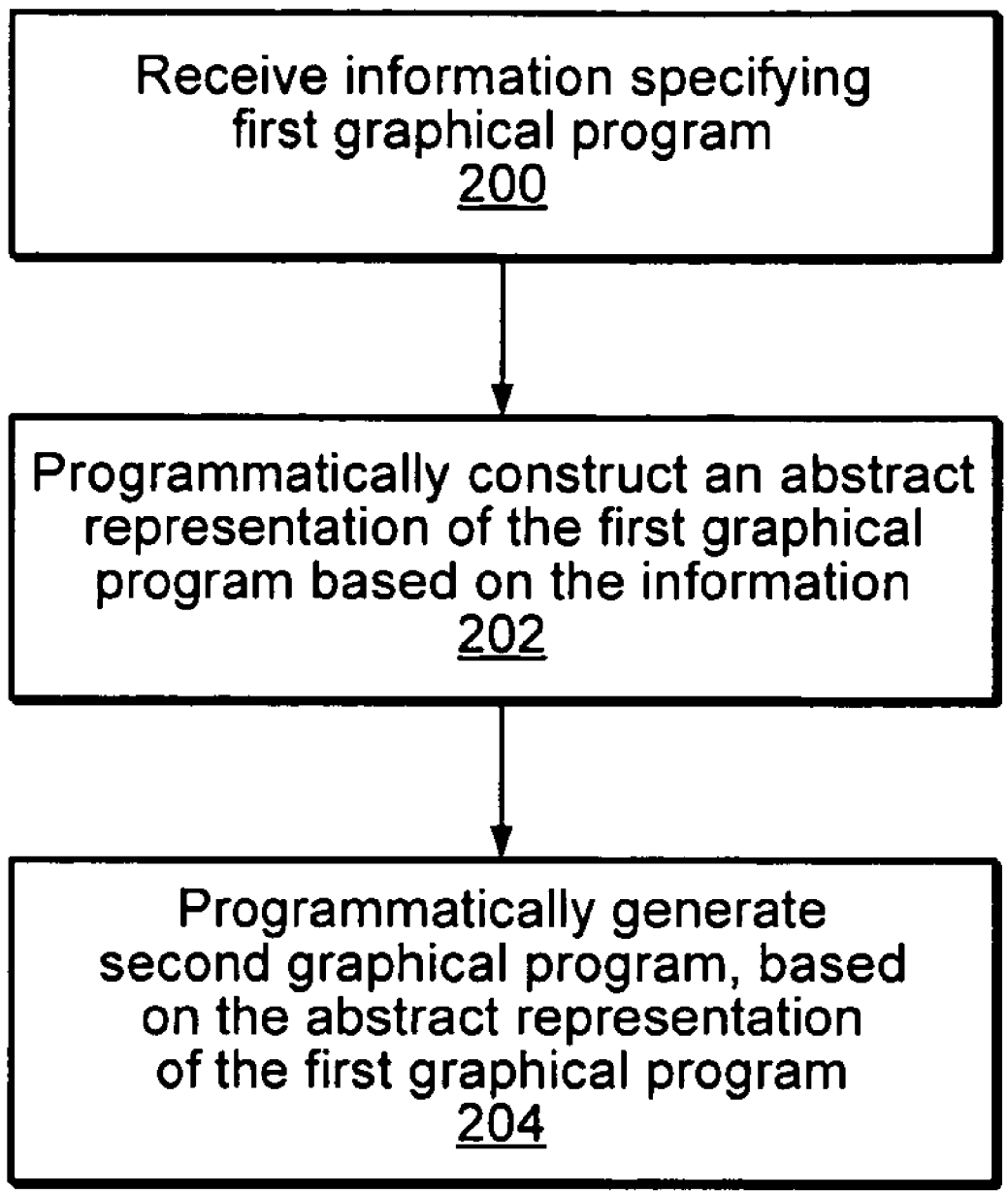
FIG. 3 is a flowchart diagram illustrating one embodiment of a method for programmatically generating a second graphical program based on a first graphical program.

FIG. 3—Programmatic Generation of a Second Graphical Program

FIG. 3 is a flowchart diagram illustrating one embodiment of a method for programmatically generating a second graphical program based on a first graphical program.

In step 200, information specifying the first graphical program may be received. The first graphical program may be associated with a first programming development environment. For example, a user may have interactively or manually created the first graphical program from within the first programming development environment, e.g., by using an editor to place various nodes on a block diagram, such that the nodes visually indicate functionality of the first graphical program. The nodes may be interconnected so as to specify data flow, control flow, and/or execution flow among the nodes in the program. The nodes may also be connected in a "signal flow" format, wherein signal flow is considered a subset of data flow. The first graphical program may also have been programmatically created.

During creation of the first graphical program, the first programming development environment may create one or more files which specify the first graphical program. In various embodiments, these files may comprise text and/or binary information. The information received in step 200 may include information from one or more of these files. For example, the information may include information specifying a set of nodes that the first graphical program uses, interconnections among these nodes, programmatic structures such as loops, etc. The information may also include information specifying a user interface for the first graphical program.

In various embodiments, the information specifying the first graphical program may be received in any of various formats or file types, e.g., depending on the first programming development environment used to create the first graphical program. For example, the information may include information received from one or more binary files specifying various data structures which the first programming development environment creates in response to development of the first graphical program and which the first programming development environment uses to directly represent the program.

In another embodiment, the information received in step 200 may include abstract information describing the first graphical program, e.g., abstract information stored in a text file which the first programming development environment is operable to generate. For example, such abstract information may fully specify the first graphical program, but the first programming development environment may also maintain other files, e.g., files including the data structures described above, which allow the first programming development environment to more efficiently manipulate the first graphical program, e.g., when editing or compiling the program. An example of abstract information received in step 200 is described below for an embodiment in which the first graphical program is a Simulink graphical program. In this case, the information is received from a textual "model file" that describes the Simulink program, which the Simulink programming development environment is operable to create.

In step 202, the method may programmatically analyze the information received in step 200 and programmatically construct an abstract representation of the first graphical program, based on this information. The information may be analyzed, examined, traversed, or parsed in any of various ways, e.g., depending on the particular form in which the information is received. An exemplary process of analyzing program information for the first graphical program is described below. As the information is analyzed, the method may operate to construct a data structure or set of data structures that abstractly represent the first graphical program. In various embodiments, the first graphical program may be abstractly represented in any of various ways. An embodiment in which the first graphical program is represented as a directed graph is described below.

In step 204, the second graphical program may be programmatically generated, based on the abstract representation of the first graphical program constructed in step 202.

Programmatically generating the second graphical program may comprise programmatically generating a block diagram including interconnected block diagram nodes that implement functionality of the first graphical program, such that when executed, the second graphical program performs the same as or substantially like the first graphical program. Programmatically generating the second graphical program may also comprise programmatically creating a graphical user interface for the second graphical program, such that when the second graphical program is executed, the graphical user interface enables the second graphical program to receive user input and/or display output similarly as the first graphical program.

The method may generate the second graphical program programmatically, without relying on user input, or may prompt for a small amount of user input to determine various options to use in generating the second graphical program. For example, in various embodiments the user may specify options such as whether to generate the second graphical program so that it resembles the first graphical program as closely as possible, e.g., in the layout and interconnections among block diagram nodes, or whether to perform optimizations or modifications where possible or necessary, e.g., to facilitate downloading the second graphical program to a hardware device for execution.

The user may also be prompted for information enabling various aspects of the first graphical program to be translated. For example, in one embodiment, the first graphical program may include functionality not natively supported by the programming development environment of the second graphical program or may include functionality for which the method lacks the necessary knowledge to translate. Thus, the user may be prompted to specify equivalent functionality to be included in the second graphical program, e.g., by specifying one or more nodes supported by the second graphical program's programming development environment or by specifying an external code module with which the second graphical program can interface, such as a DLL or other type of module, wherein the external code module implements the functionality.

In other embodiments, the user may specify any of various other types of information, e.g., to specify a file name(s) for the second graphical program, to specify options affecting the appearance of the user interface for the second graphical program, etc.

The second graphical program may be generated in such a way as to be associated with a second programming development environment. For example, as described above, a programming development environment may use any of various types of files to specify a graphical program, such as text or binary files that specify a set of nodes that the graphical program uses, interconnections among these nodes, programmatic structures such as loops, etc. Thus, in step 204 a file or set of files may be created of the appropriate format such that the second programming development environment is operable to treat the generated second graphical program as if the second graphical program were interactively created by a user from within the second programming development environment. Thus, once the second graphical program has been generated, the user may use the second programming development environment to edit the second graphical program, execute the second graphical program, etc.

In the preferred embodiment, the second programming development environment provides an application programming interface (API) that may be used to programmatically create the second graphical program. For example, for each node, user interface element, or other object of the second graphical program, the API may be called to programmatically add the object to the second graphical program, connect the object to other objects of the second graphical program, etc. Thus, any necessary files or other constructs needed by the second programming development environment in order to use the second graphical program may be automatically created as a result of calling the API. In another embodiment, the method may operate to directly create these files, rather than calling an API to do so.

Depending on the functionality and implementation of the first graphical program, the programmatically generated second graphical program may be a fully working program that implements the entire functionality of the first graphical program. In this case, the user can execute the second graphical program in the second programming development environment, and the second graphical program will perform identically with or substantially like the first graphical program. However, in some cases, it may not be possible to create a fully working second graphical program. For example, the second programming development environment may not support certain functionality used in the first graphical program. In this case, the user may need to alter or complete the second graphical program before executing it. For example, the second programming development environment may allow the user to link the second graphical program with an external code module which implements missing functionality.

In the description above, the abstract representation created in step 202 is described as a representation of the first graphical program, which is then used in programmatically generating the second graphical program. It is noted that in various embodiments, it may be more accurate to describe the abstract representation as a representation of the functionality of the first (and/or second) graphical program. For example, in some embodiments, the second programming development environment of the second graphical program may not support a one-to-one translation of nodes of the first graphical program into nodes for the second graphical program, e.g., because one or more nodes of the first program are not supported by the second programming development environment.

Thus, in various embodiments, the abstract representation may be modified in such a way that a second graphical program supported by the second programming development environment may be generated from the abstract representation. Such modifications may be performed in any way appropriate for a particular embodiment or program. For example, in the situation described above in which a first node of the first program does not have an equivalent node in the second programming development environment, it may be possible to modify the abstract information to substitute two or more interconnected nodes performing equivalent functionality of the first node, such that when the second graphical program is programmatically generated based on the abstract information, the two or more interconnected nodes are included in the block diagram of the second graphical program. In another embodiment, the abstract representation may not be modified, but the multiple nodes may be substituted for the first node at the time that the second graphical program is programmatically generated from the abstract information.

As another example, the abstract representation may be modified to account for programming models or techniques used in the first graphical program but not supported by the second programming development environment. For example, as described below, in one embodiment the first graphical program may have one or more loops among block diagram nodes, but the second programming development environment may not support such loops. When first constructed, the abstract representation may reflect the use of such a loop in the first graphical program. Thus, the abstract representation may need to be modified such that features supported by the second programming development environment are used to represent an equivalent program that does not utilize loops among block diagram nodes.

As another example, the abstract representation may be modified, if desired by the user, to improve program efficiency, e.g., to facilitate downloading the second graphical program to a hardware device for execution. For example, in some cases it may be possible to automatically reorder various block diagram nodes, e.g., to achieve increased parallelism during program execution.

Thus in various embodiments, the final abstract representation used to create the second graphical program in step 204 may be constructed in various ways and/or in multiple steps, and the final abstract representation may or may not closely resemble the first graphical program, e.g., in terms of interconnected nodes specified by the abstract representation. In the preferred embodiment, the final abstract representation is, however, faithful to the first graphical program in terms of functionality of the first graphical program, at least so far as possible.

Figure 4:
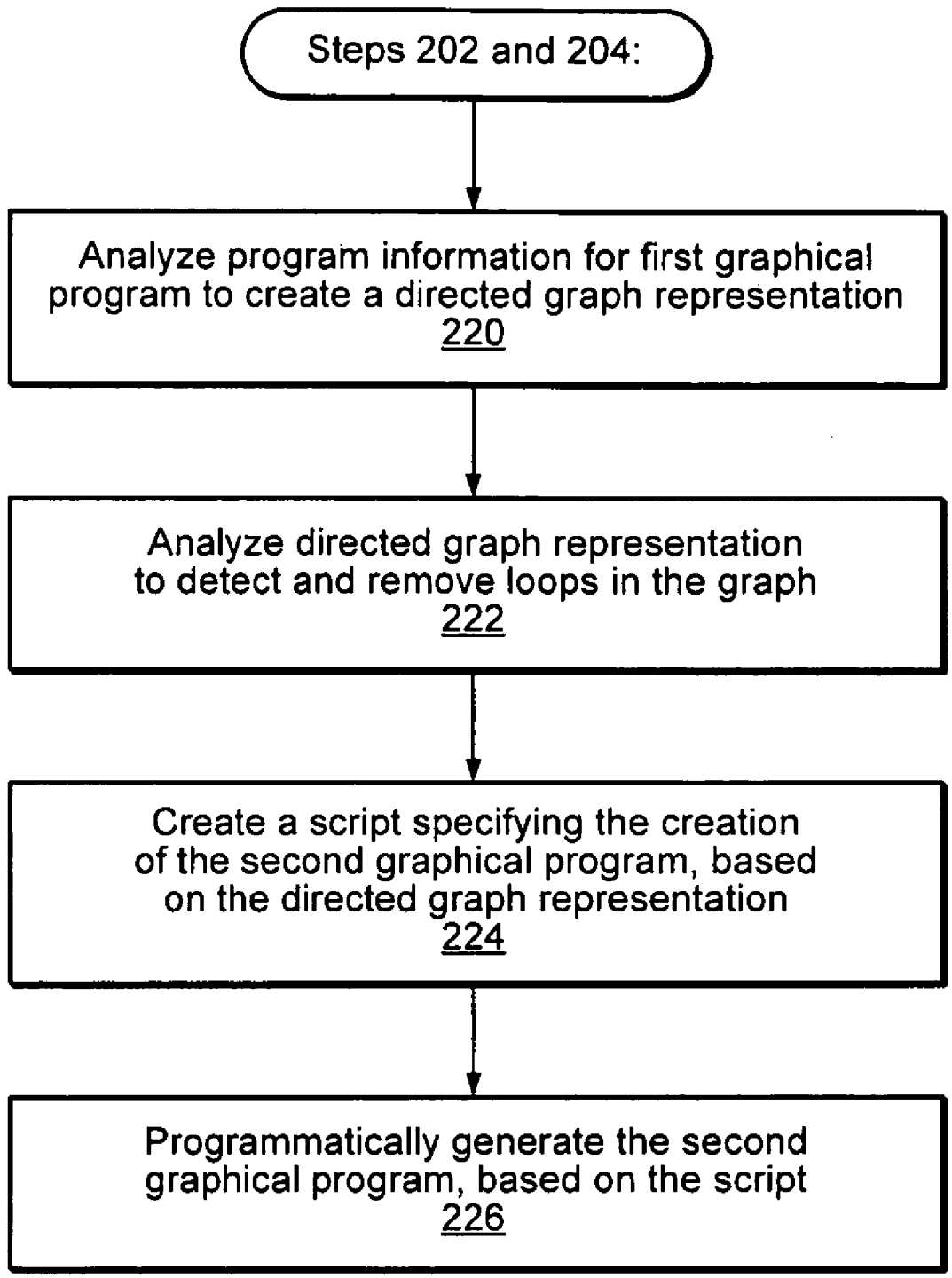
FIG. 4 is a flowchart diagram illustrating one embodiment of steps 202 and 204 of FIG. 3, in which an abstract representation of the first graphical program is constructed and the second graphical program is then programmatically generated based on this abstract representation.

FIG. 4—Steps 202 and 204

FIG. 4 is a flowchart diagram illustrating one embodiment of steps 202 and 204 of FIG. 3, in which an abstract representation of the first graphical program is constructed and the second graphical program is then programmatically generated based on this abstract representation. As described above, the first program may be represented in any of various ways. In the embodiment shown in FIG. 4, program information for the first program may be analyzed in order to represent the first program as a directed graph, a well-known data structure in the art.

In step 220, program information for the first graphical program may be analyzed in order to create the directed graph representation. One embodiment of step 220 is described below.

In step 222, the method may analyze the directed graph representation to detect loops in the graph and may alter the representation in order to remove the loops. Step 222 may be performed in a case when the programming development environment of the first graphical program supports loops in the interconnections among block diagram nodes, but the programming development environment of the second graphical program does not. In other cases, step 222 may not be necessary. The directed graph may be modified in any of various ways, e.g., depending on the second programming development environment, such that the loop(s) is removed, and the second graphical program still functions equivalently to the first graphical program. One example of modifying the directed graph to account for loops is described below.

In step 224, a script specifying the creation of the second graphical program may be created, based on the directed graph representation. This script may facilitate the programmatic creation of the second graphical program. For example, in one embodiment the script may comprise a list of operations to create block diagram nodes of the appropriate types and having appropriate sizes and positions within the block diagram, another list of operations to wire the block diagram nodes together, etc.

In step 226, the second graphical program may then be programmatically generated, based on the script. For example, in one embodiment each operation of the script may have an equivalent application programming interface (API) call that may be executed. By executing API calls specified by the script, the second graphical program may be programmatically created. In another embodiment, script operations may not have a one-to-one correspondence with API calls, but multiple API calls may be performed to perform each operation.

It is noted that some embodiments may not use a script, and thus step 224 may not be performed. For example, instead of first determining a list of operations that will result in the desired second graphical program being generated and then performing the operations, each operation may be performed as the operation is determined.

As described above, the directed graph representation of the first graphical program may be altered after first being constructed. Thus, in various embodiments the first graphical program may initially be represented as a directed graph, but the final information used in creating the script in step 224 may or may not be a directed graph representation.

Figure 5:
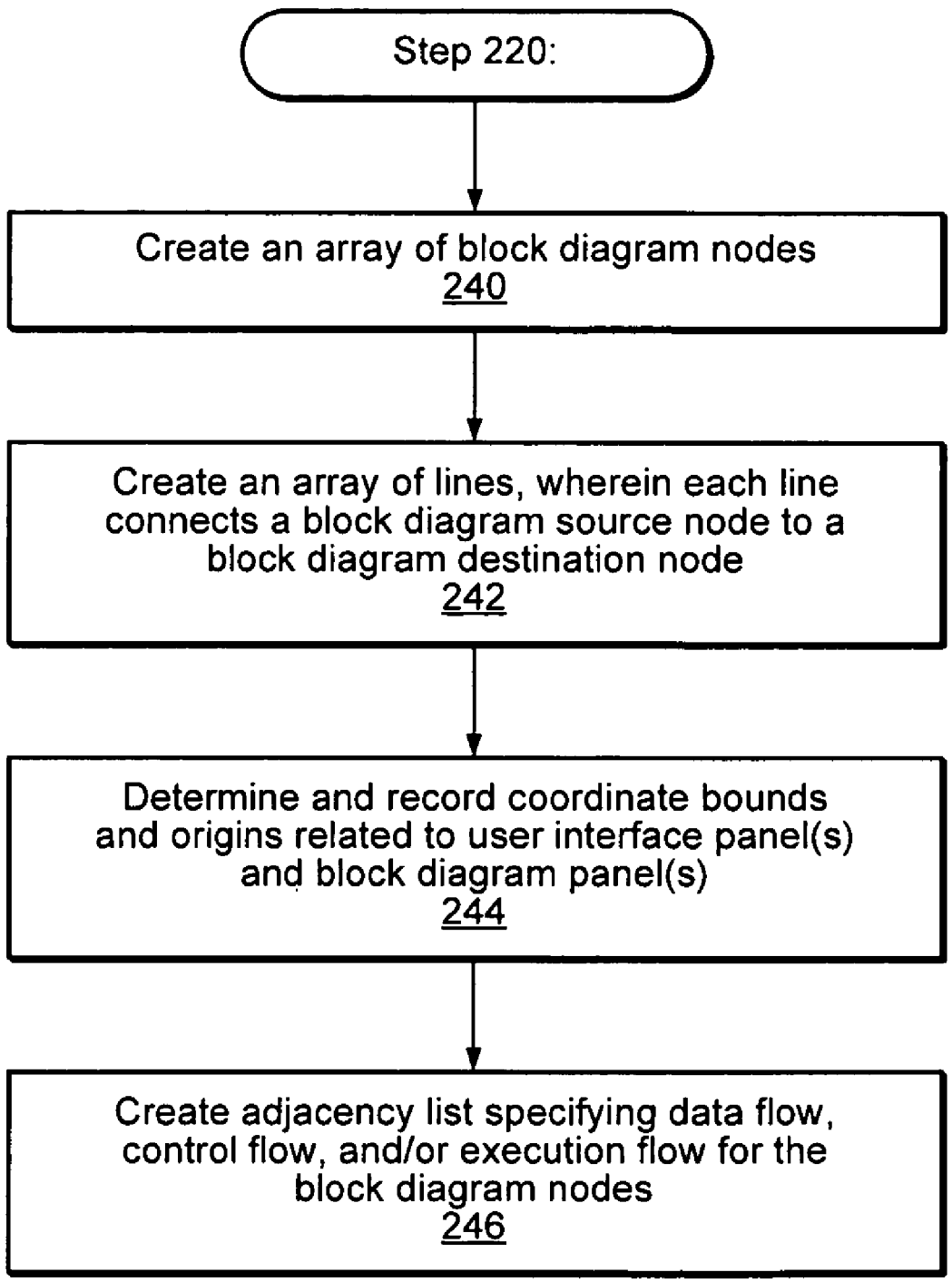
FIG. 5 is a flowchart diagram illustrating one embodiment of step 220 of FIG. 4, in which program information for a first graphical program is analyzed in order to create a directed graph representation of the first program.

FIG. 5—Creating a Directed Graph Representation of a First Graphical Program FIG. 5 is a flowchart diagram illustrating one embodiment of step 220 of FIG. 4, in which program information for a first graphical program is analyzed in order to create a directed graph representation of the first program.

In step 240, an array or list of block diagram nodes included in the first graphical program may be created. These block diagram nodes may be determined in any of various ways, e.g., depending on the format or content of the program information being analyzed. As described above, the program information for the first graphical program may comprise the first graphical program itself, i.e., one or more files or data structures specifying the first graphical program, or may comprise abstract information specifying the first graphical program, such as a textual model file. The program information is preferably structured or organized in a known manner, making possible the determination of the block diagram nodes comprised in the block diagram of the first graphical program.

In step 242, an array or list of lines may be created, wherein each line connects a block diagram source node to a block diagram destination node. Thus, the array of lines represents the interconnections among block diagram nodes, wherein each interconnection may represent one or more of a directional data flow, control flow, and/or execution flow from a source node to a destination node. Similarly, as for step 240, the lines included in the first graphical program may be deter-mined in any of various ways, depending on the format or content of the program information being analyzed.

In step 244, coordinate bounds and origins related to user interface panel(s) (or windows) and block diagram panel(s) (or windows) of the first graphical program may be determined and recorded. It may be desirable for the second graphical program to resemble the first graphical program as closely as possible. Thus, by determining coordinate origins and sizes of panels of the first graphical program and by determining origins and sizes of objects within these windows, windows of the second graphical program may be created of the appropriate size and at the appropriate positions, and objects may be created of the appropriate sizes and arranged properly within the windows of the second graphical program.

Step 244 may apply to user interface panels or windows of the first graphical program. For each user interface panel, the size and origin of the panel may be determined. Similarly as described above, the program information of the first graphical program preferably enables the method to determine this information, and the information may be determined in any of various ways. Also, for each user interface element, such as user interface controls and indicators, the size of the element and the origin of the element within the user interface panel may be determined and recorded, so that the appearance of the user interface may be duplicated for the second graphical program.

Step 244 may also apply to block diagram panels or windows of the first graphical program. For each block diagram panel, the size and origin of the panel may be determined. Similarly as described above, the program information of the first graphical program preferably enables the method to determine this information, and the information may be determined in any of various ways. Thus, the block diagram panels of the second graphical program may be sized and arranged similarly as in the first graphical program, e.g., when the block diagram panels are displayed at edit time. Also, for each block diagram node or other object within a block diagram, the size of the object and the origin of the object within the block diagram panel may be determined and recorded, so that the appearance of the block diagram may be duplicated for the second graphical program.

In step 246, an adjacency list specifying one or more of data flow, control flow, and/or execution flow for the block diagram nodes of the first graphical program may be created. This adjacency list may be equivalent to a directed graph data structure representing the first graphical program, wherein each block diagram node has an equivalent node in the directed graph, and each line connecting two block diagram nodes is represented as an edge in the directed graph. The adjacency list may be determined and represented in any of various ways. One embodiment of a method for determining the adjacency list is described below.

Once the adjacency list has been created, the second graphical program may be programmatically created from the adjacency list information, as described above (and possibly after making modifications to the information, as described).

Figure 6:
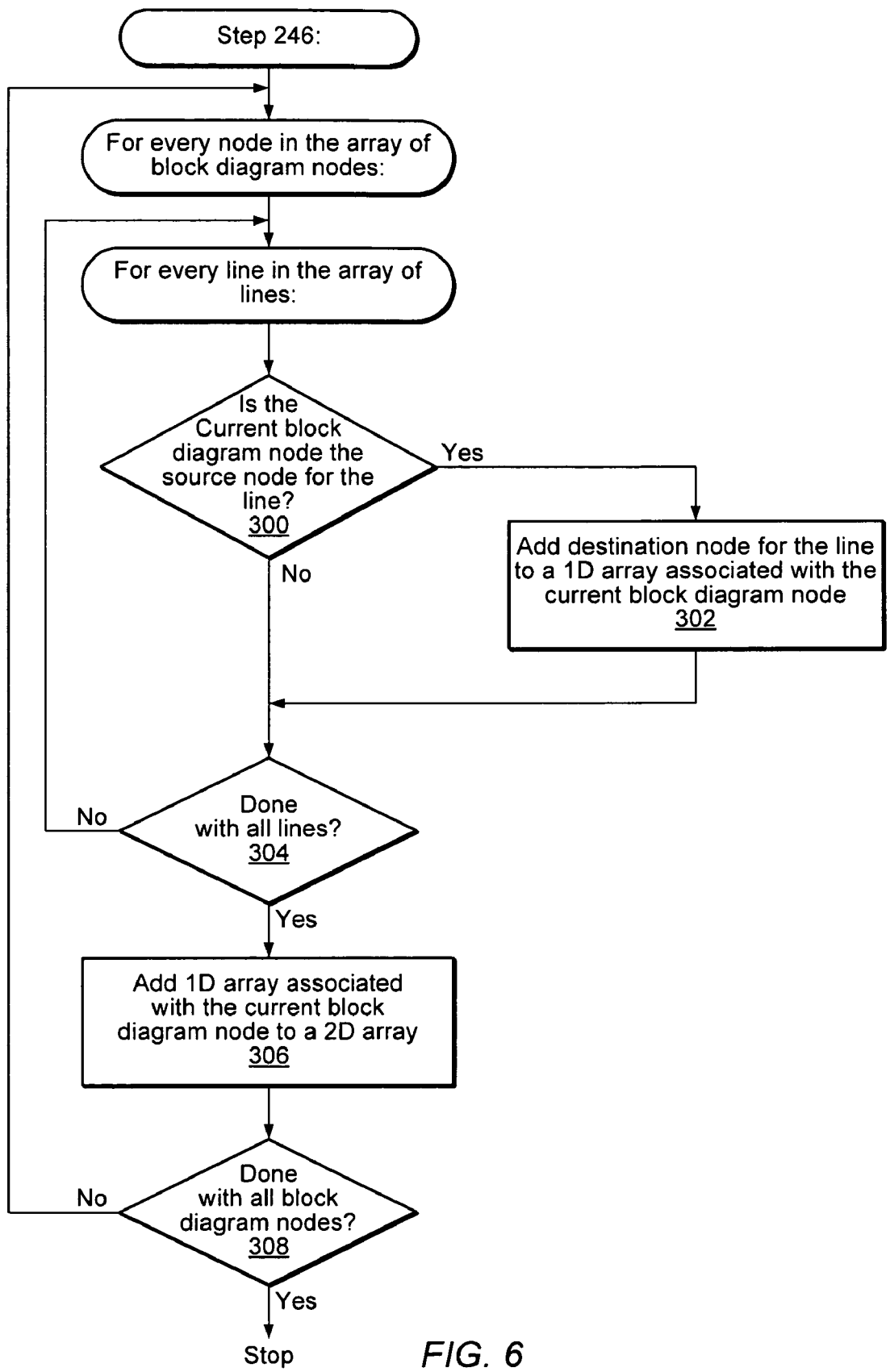
FIG. 6 is a flowchart diagram illustrating one embodiment of step 246 of FIG. 5, in which an adjacency list specifying one or more of data flow, control flow, and/or execution flow for the block diagram nodes of the first graphical program is created.

FIG. 6—Creating the Adjacency List

FIG. 6 is a flowchart diagram illustrating one embodiment of step 246 of FIG. 5, in which an adjacency list specifying one or more of data flow, control flow, and/or execution flow for the block diagram nodes of the first graphical program is created. In this embodiment, a two-dimensional array representing the adjacency list is created.

The flowchart of FIG. 6 illustrates two nested loops. The outer loop is performed for each node in the array of block diagram nodes, and the inner loop is performed for each line in the array of lines and during each iteration of this outer loop.

In step 300, given a current block diagram node (with respect to the outer loop) and current line (with respect to the inner loop), the method determines whether the current block diagram node is the same as the source node for the line. If so, then in step 302 the destination node for the line is added to a one-dimensional array associated with the current block diagram node.

Thus, once step 300 has been performed for each line, a one-dimensional array for the current block diagram node will have been created, wherein the array includes each destination node for which the current node is a source. In step 306, this one-dimensional array may be added as a row in a two-dimensional array. Thus, once the outer loop has been performed for each block diagram node, the two-dimensional array includes a row associated with each block diagram node, wherein each row specifies zero or more destination nodes for which the block diagram node is a source. As illustrated in an example below, this two-dimensional array is equivalent to a directed graph representation of the first graphical program.

As noted above, FIG. 6 represents one embodiment of creating an adjacency list, and any of various other methods may be used. Also, other equivalent or similar representations may be used in place of this type of adjacency list. For example, in one embodiment, an equivalent structure referred to as an adjacency matrix may be created instead of or in addition to an adjacency list. Given a graphical program with N nodes, an adjacency matrix may be represented as a two-dimensional array of size N*N. For an element [X,Y] of this array, the element would have a value of 1 if there is a line from block diagram node X to block diagram node Y, or would have a value of 0 otherwise.

FIGS. 7-13: Simulink to LabVIEW Example

In various embodiments, the methods described above may be utilized to port graphical programs from any of various first programming development environments to any of various second programming development environments. Examples include: Simulink to LabVIEW, VEE to LabVIEW, Softwire to LabVIEW, LabVIEW to Simulink, LabVIEW to VEE, Simulink to VEE, etc.

In one embodiment, the method may be used to automatically generate a LabVIEW program from a Simulink program. The Simulink programming development environment is operable to create a textual "model file" that describes a Simulink graphical program. The method may receive this model file and parse the file to construct a directed graph data structure abstractly representing the Simulink graphical program. The method may then utilize an API supported by the LabVIEW programming development environment to programmatically generate a LabVIEW program that implements functionality of the Simulink program.

Figure 7:
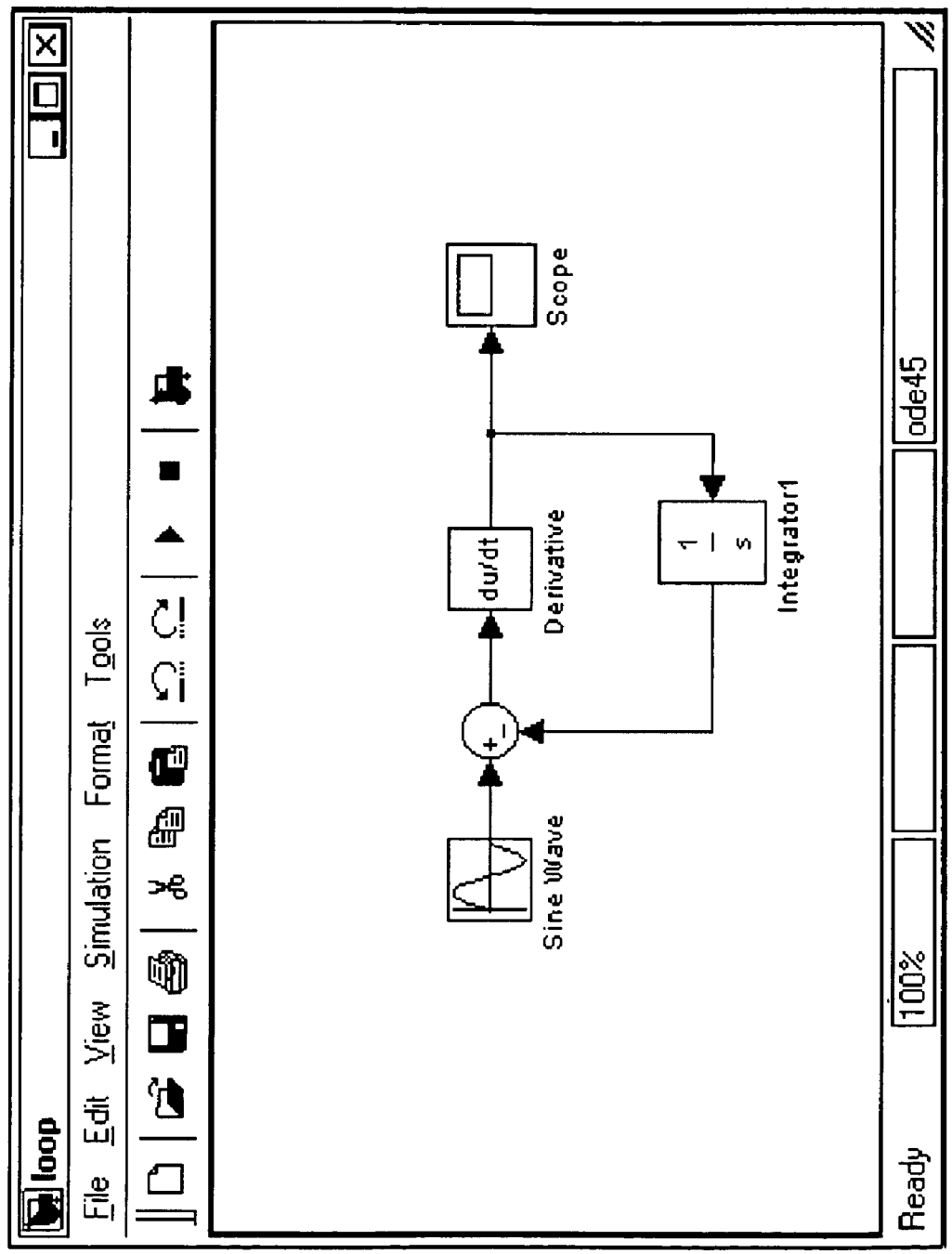
FIG. 7 illustrates an exemplary Simulink graphical program which generates and displays a waveform.

FIG. 7 illustrates an exemplary Simulink graphical program which generates and displays a waveform. The following text is taken from a model (.mdl) file describing the Simulink program, which was generated by the Simulink programming development environment:

```
Model {
    Name            "loop"
    Version    3.00
    SimParamPage    "Solver"
    SampleTimeColors    off
```

-continued

```
    InvariantConstants              off
    WideVectorLines     off
    ShowLineWidths      off
    ShowPortDataTypes   off
    StartTime           "0.0"
    StopTime            "10.0"
    SolverMode          "Auto"
    Solver      "ode45"
    RelTol      "1e-3"
    AbsTol      "auto"
    Refine      "1"
    MaxStep     "auto"
    InitialStep         "auto"
    FixedStep           "auto"
    MaxOrder            5
    OutputOption        "RefineOutputTimes"
    OutputTimes         "[ ]"
    LoadExternalInput   off
    ExternalInput               "[t, u]"
    SaveTime            on
    TimeSaveName        "tout"
    SaveState           off
    StateSaveName               "xout"
    SaveOutput          on
    OutputSaveName      "yout"
    LoadInitialState    off
    InitialState        "xInitial"
    SaveFinalState      off
    FinalStateName      "xFinal"
    SaveFormat          "Matrix"
    LimitMaxRows        off
    MaxRows   "1000"
    Decimation          "1"
    AlgebraicLoopMsg    "warning"
    MinStepSizeMsg      "warning"
    UnconnectedInputMsg         "warning"
    UnconnectedOutputMsg        "warning"
    UnconnectedLineMsg          "warning"
    InheritedTsInSrcMsg         "warning"
    IntegerOverflowMsg          "warning"
    UnnecessaryDatatypeConvMsg      "none"
    Int32ToFloatConvMsg         "warning"
    SignalLabelMismatchMsg      "none"
    ConsistencyChecking         "off"
    ZeroCross           on
    SimulationMode      "normal"
    BlockDataTips               on
    BlockParametersDataTip      on
    BlockAttributesDataTip      off
    BlockPortWidthsDataTip      off
    BlockDescriptionStringDataTip           off
    BlockMaskParametersDataTip          off
    ToolBar     on
    StatusBar           on
    BrowserShowLibraryLinks     off
    BrowserLookUnderMasks       off
    OptimizeBlockIOStorage      on
    BufferReuse         on
    BooleanDataType     off
    RTWSystemTargetFile         "grt.tlc"
    RTWInlineParameters         off
    RTWRetainRTWFile    off
    RTWTemplateMakefile         "grt_default_tmf"
    RTWMakeCommand      "make_rtw"
    RTWGenerateCodeOnly         off
    ExtModeMexFile      "ext_comm"
    ExtModeBatchMode    off
    ExtModeTrigType     "manual"
    ExtModeTrigMode     "oneshot"
    ExtModeTrigPort     "1"
    ExtModeTrigElement          "any"
    ExtModeTrigDuration         1000
    ExtModeTrigHoldOff          0
    ExtModeTrigDelay    0
    ExtModeTrigDirection        "rising"
    ExtModeTrigLevel    0
    ExtModeArchiveMode          "off"
    ExtModeAutoIncOneShot       off
    ExtModeIncDirWhenArm        off
    ExtModeAddSuffixToVar       off
```

```
ExtModeWriteAllDataToWs          off
ExtModeArmWhenConnect            off
Created         "Fri Aug 11 14:43:19 2000"
UpdateHistory                    "UpdateHistoryNever"
ModifiedByFormat         "%<Auto>"
ModifiedDateFormat               "%<Auto>"
LastModifiedDate         "Fri Sep 08 17:59:07 2000"
ModelVersionFormat               "1.%<AutoIncrement:5>"
ConfigurationManager             "none"
BlockDefaults {
    Orientation                  "right"
    ForegroundColor      "black"
    BackgroundColor      "white"
    DropShadow           off
    NamePlacement        "normal"
    FontName             "Helvetica"
    FontSize             10
    FontWeight           "normal"
    FontAngle            "normal"
    ShowName             on
}
AnnotationDefaults {
    HorizontalAlignment          "center"
    VerticalAlignment            "middle"
    ForegroundColor      "black"
    BackgroundColor      "white"
    DropShadow           off
    FontName             "Helvetica"
    FontSize             10
    FontWeight           "normal"
    FontAngle            "normal"
}
LineDefaults {
    FontName             "Helvetica"
    FontSize             9
    FontWeight           "normal"
    FontAngle            "normal"
}
System {
    Name                 "loop"
    Location             [328, 77, 828, 378]
    Open                 on
    ModelBrowserVisibility       off
    ModelBrowserWidth            200
    ScreenColor                  "automatic"
    PaperOrientation             "landscape"
    PaperPositionMode            "auto"
    PaperType            "usletter"
    PaperUnits           "inches"
    ZoomFactor           "100"
    AutoZoom             on
    ReportName                   "simulink-default.rpt"
    Block {
        BlockType                Derivative
        Name             "Derivative"
        Position         [230, 85, 260, 115]
    }
    Block {
        BlockType                Integrator
        Name             "Integrator1"
        Ports            [1, 1, 0, 0, 0]
        Position         [240, 161, 270, 199]
        Orientation      "left"
        ExternalReset    "none"
        InitialConditionSource   "internal"
        InitialCondition         "1"
        LimitOutput      off
        UpperSaturationLimit     "inf"
        LowerSaturationLimit     "-inf"
        ShowSaturationPort       off
        ShowStatePort    off
        AbsoluteTolerance        "auto"
    }
    Block {
        BlockType                Scope
        Name             "Scope"
        Ports            [1, 0, 0, 0, 0]
        Position         [335, 84, 365, 116]
        Floating         off
        Location         [389, 458, 713, 697]
        Open             off
        NumInputPorts    "1"
        TickLabels       "OneTimeTick"
        ZoomMode         "on"
        List {
            ListType     AxesTitles
            axes1                "%<SignalLabel>"
        }
        Grid             "on"
        TimeRange                "auto"
        YMin             "-5"
        YMax             "5"
        SaveToWorkspace          off
        SaveName         "ScopeData"
        DataFormat       "StructureWithTime"
        LimitMaxRows     on
        MaxRows          "5000"
        Decimation       "1"
        SampleInput      off
        SampleTime       "0"
    }
    Block {
        BlockType                Sin
        Name             "Sine Wave"
        Position         [115, 85, 145, 115]
        Amplitude        "5"
        Frequency        "1"
        Phase            "0"
        SampleTime       "0"
    }
    Block {
        BlockType                Sum
        Name             "Sum"
        Ports            [2, 1, 0, 0, 0]
        Position         [175, 90, 195, 110]
        ShowName         off
        IconShape                "round"
        Inputs           "|+-"
        SaturateOnIntegerOverflow        on
    }
    Line {
        SrcBlock         "Derivative"
        SrcPort          1
        Points           [30, 0]
        Branch {
            DstBlock     "Scope"
            DstPort      1
        }
        Branch {
            Points               [0, 80]
            DstBlock     "Integrator1"
            DstPort      1
        }
    }
    Line {
        SrcBlock         "Sum"
        SrcPort          1
        DstBlock         "Derivative"
        DstPort          1
    }
    Line {
        SrcBlock         "Sine Wave"
        SrcPort          1
        DstBlock         "Sum"
        DstPort          1
    }
    Line {
        SrcBlock         "Integrator1"
        SrcPort          1
        Points           [-50, 0]
        DstBlock         "Sum"
        DstPort          2
    }
}
```

The method may receive this model file description of the Simulink graphical program and analyze this information to construct an abstract representation of the Simulink graphical program. As described above, in one embodiment the Simulink graphical program may be represented as a directed graph, which may be constructed as described in FIGS. 5 and 6.

Figure 8:
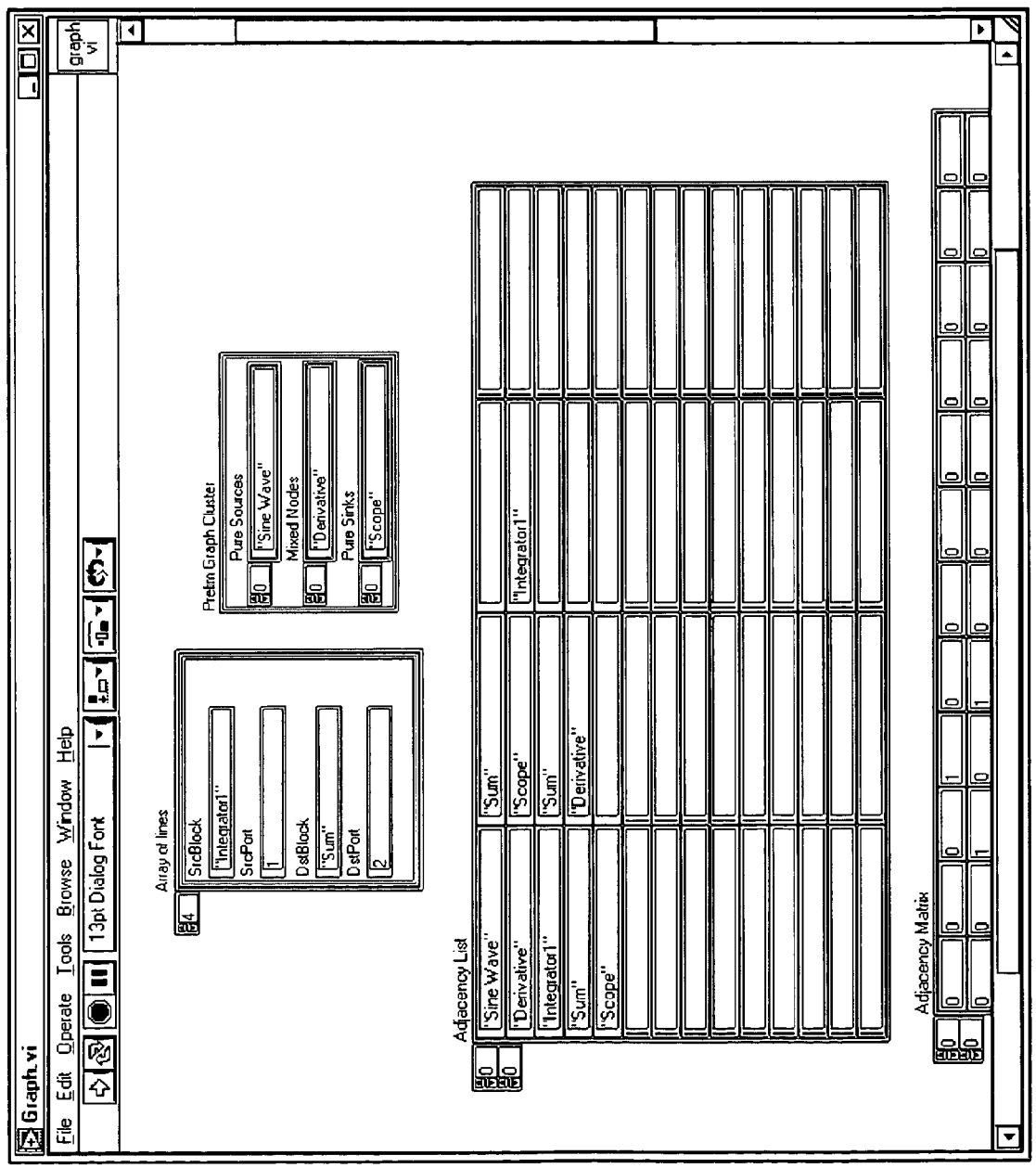
FIG. 8 illustrates a two-dimensional adjacency list array representing the Simulink program of FIG. 7.
Figure 9:
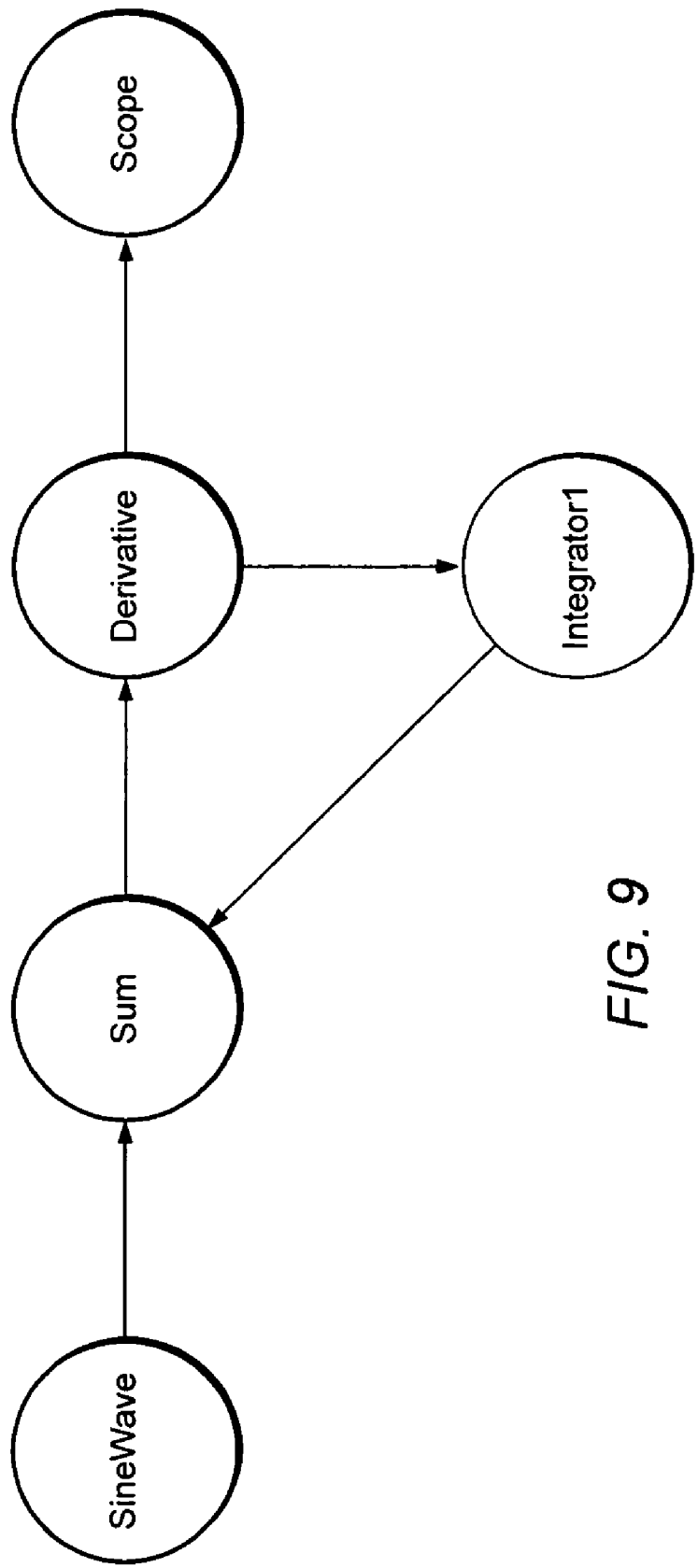
FIG. 9 illustrates an abstract directed graph equivalent to the adjacency list shown in FIG. 8.

FIG. 8 illustrates a two-dimensional adjacency list array computed according to the method of FIG. 6. As shown, the two-dimensional array includes a row for each block diagram node of the FIG. 7 Simulink graphical program (the first column indicates the node with which the row is associated.) For each row, the columns after the first column list any destination nodes for which the node listed in the first column is a source node. Thus, for example, the "Sum" node is listed as a destination node of the "Sine Wave" source node. Note that the "Derivative" block diagram node has lines to both the "Scope" node and the "Integrator1" node in the FIG. 7 block diagram. Thus, the adjacency list indicates that both the "Scope" node and the "Integrator1" node are destination nodes for the "Derivative" node. Since the "Scope" node is a pure sink, no destination nodes for the "Scope" node are indicated in the adjacency list. FIG. 9 illustrates an abstract directed graph equivalent to the adjacency list shown in FIG. 8. Note that the abstract directed graph of FIG. 9 appears very similar to the actual graphical program block diagram of FIG. 7.

In the description above, it is assumed that a single output signal is associated with each block diagram node. In many graphical programming development environments, such as LabVIEW, block diagram nodes may have multiple input and/or output terminals. For programs having nodes which receive and/or provide multiple signals using different node terminals, the method described above may be modified to account for the multiple terminals, e.g., by subindexing the terminals. Thus, instead of the adjacency list having one row for each block diagram node, there may be multiple rows for each node, depending on the number of output terminals for the node. Also, each destination node may be listed according to which input terminal of the destination node receives the signal.

As shown in the block diagram of FIG. 7 and the abstract directed graph of FIG. 9, the first graphical program has a loop among the interconnections of the "Sum", "Derivative", and "Integrator1" block diagram nodes. The LabVIEW programming development environment does not support the use of these types of block diagram loops. Thus, as illustrated in step 222 of FIG. 4, the directed graph representation of the Simulink graphical program may be analyzed in order to detect and remove such loops. Techniques for detecting loops in directed graphs are well known in the art and are not described herein. Once a loop has been detected, the abstract representation of the first graphical program may be modified in any of various ways, depending on a particular embodiment (or, as discussed above, the abstract information may not be modified, but the loop may be taken into account when the second graphical program is generated).

Figure 12:
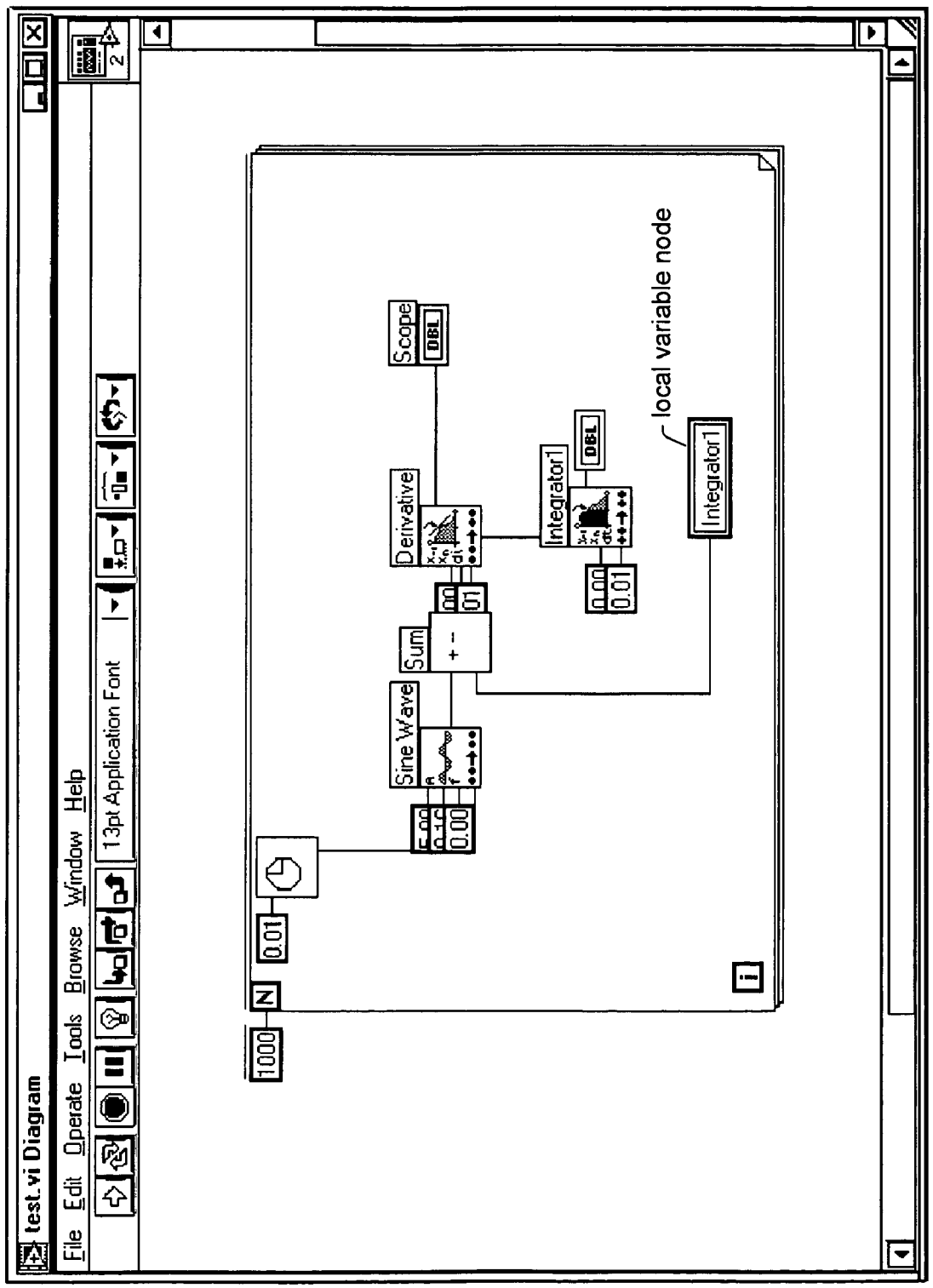
FIG. 12 illustrates another view of the LabVIEW block diagram of FIG. 11, in which a user has moved a local variable node from its default location.

For the LabVIEW programming development environment, the LabVIEW graphical program may be generated to utilize a LabVIEW local variable node, avoiding the use of a loop. FIG. 12 illustrates the block diagram of a LabVIEW graphical program programmatically generated based on the Simulink program shown in FIG. 7. As shown, the LabVIEW block diagram includes a local variable node labeled "Integrator1". This local variable is logically associated with the output value of the "Integrator1" block diagram node, such that the output value and the value of the local variable node are always the same. Since the local variable node is a source node for the "Sum" node, the effect is the same as if the "Integrator1" node output looped back to the "Sum" node.

Figure 10:
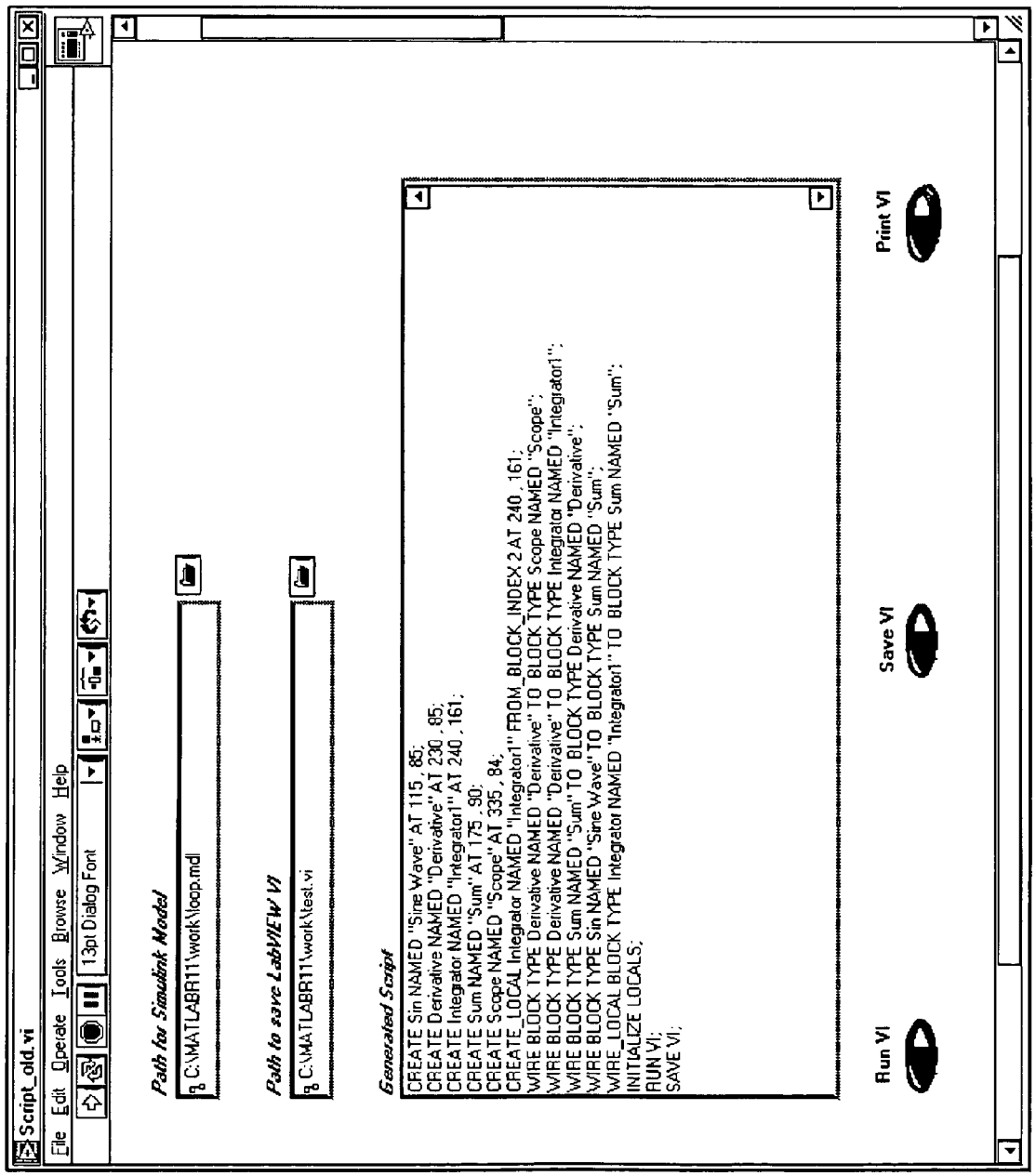
FIG. 10 illustrates a user interface for a graphical program generation (GPG) program, in which a script specifying creation of a second graphical program is displayed.
Figure 11:
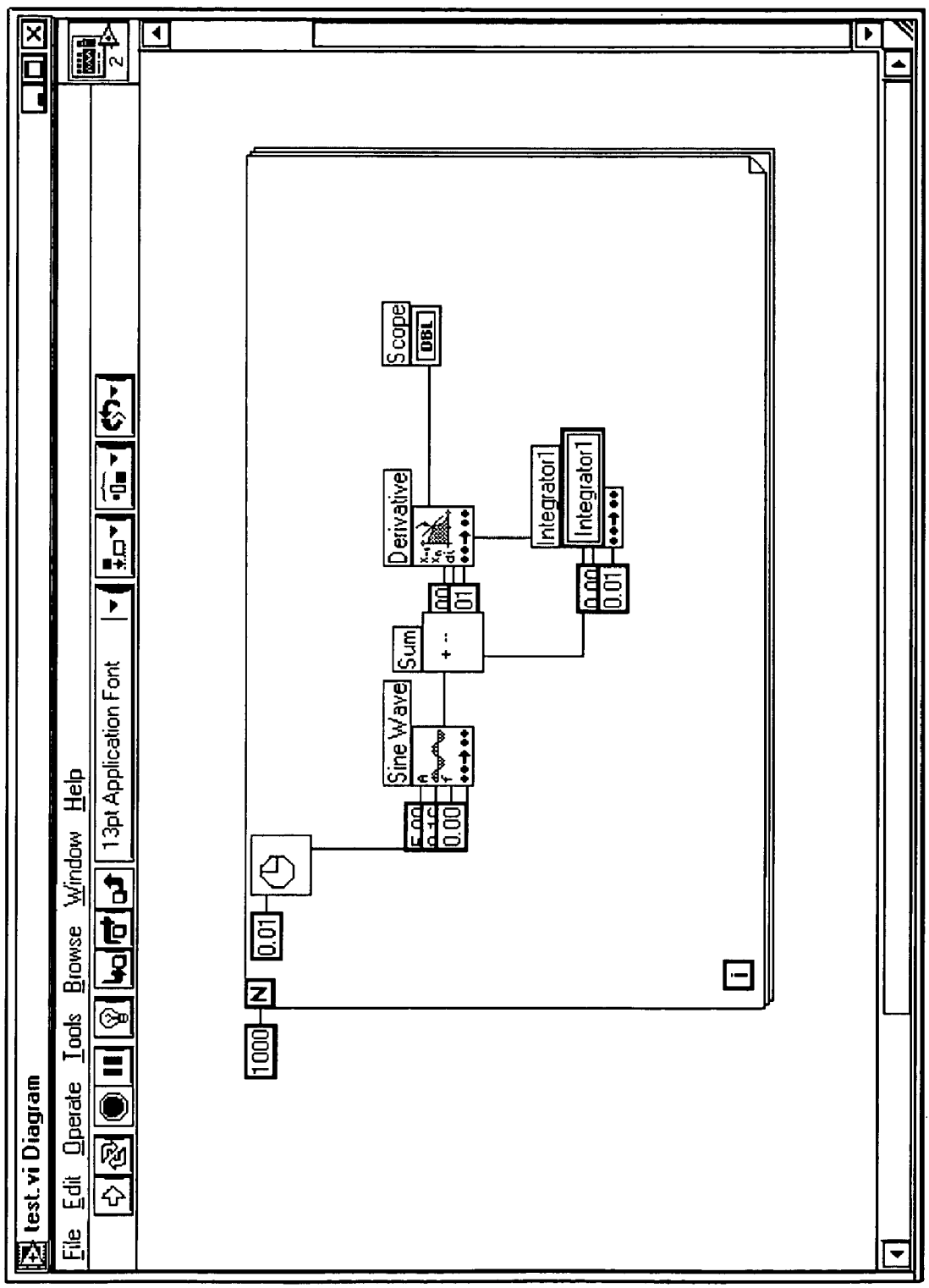
FIG. 11 illustrates a LabVIEW block diagram generated based on the script of FIG. 10, wherein the LabVIEW block diagram implements functionality of the Simulink block diagram of FIG. 7.

As described above with reference to FIG. 4, in one embodiment a script specifying the creation of the second graphical program may be created, based on the abstract representation of the first graphical program, and this script may be used in programmatically generating the second graphical program. FIG. 10 illustrates a user interface for a graphical program generation (GPG) program, displaying such a script, and FIG. 11 illustrates a LabVIEW block diagram generated based on the script. As shown, the script includes a set of CREATE operations specifying block diagram nodes to be created.

For each CREATE operation, the GPG program may include one or more nodes in the second graphical program, based on the node to be created. In one embodiment, each node listed in a CREATE script operation may have one corresponding node provided by the programming development environment of the second graphical program, and this corresponding node may thus be included in the second graphical program. As shown, the CREATE operations may specify the desired coordinate origin and/or size for each node.

In another embodiment, the GPG program may include multiple block diagram nodes in the second graphical program's block diagram and may wire them together appropriately in order to implement the node specified by a CREATE operation. If desired, the GPG program may encapsulate these multiple nodes behind a single subprogram node, such that the top-level block diagram of the second graphical program appears the same as the first graphical program.

In various embodiments, implementing a CREATE operation may involve not only including one or more nodes in the second graphical program, but also properly configuring the nodes. For example, the GPG program may set various properties associated with each node to perform this configuration. Also, the configuration may involve adding additional elements to the block diagram. For example, as shown in the LabVIEW program of FIG. 11, numeric or other constant values may need to be wired to the nodes, wherein these values may affect the execution of a node. Although the FIG. 7 Simulink program does not show such values, the values may be implicitly associated with the Simulink nodes. For example, in Simulink, a user may double-click on a Simulink node to display a dialog box for setting the values affecting various node properties. On the other hand, in LabVIEW the values may be explicitly shown as node inputs in the block diagram.

In one embodiment, the GPG program may utilize translation information from an external file or database, wherein the translation information specifies how to implement CREATE operations. For example, the following translation information may be used in translating the Simulink program of FIG. 7 to the LabVIEW program of FIG. 11:

Block Specifications
Sin:SubVI;IN1:;OUT1:sine wave;#0;
RandomNumber:SubVI;IN1:;OUT1:Gaussian white noise;#0;
Integrator:SubVI;IN1:input data;OUT1:integral x(t);#1;
Derivative:SubVI;IN1:input data;OUT1:dx/dt;#1;
TransferFcn:SubVI;IN1:input point;OUT1:output point;#1;
Subsystem:SubVI;IN1:;OUT1:;#0;
Sum:SubVI;IN1:x;IN2:y;OUT1:x+y;#0;
Gain:Function;IN1:x;OUT1:x*y;#0;
Abs:Function;IN1:x;OUT1:abs(x);#0;
Scope:Terminal;IN1:;OUT1:;#0;
Display:Terminal;IN1:;OUT1:;#0;
Inport:Terminal;IN1:;OUT1:;#0;
Outport:Terminal;IN1:;OUT1:;#0;

-continued

```
Clock:SubVI;IN1:;OUT1:Time;#0;
EOF
```

This translation information specifies whether each Simulink block is translated to a LabVIEW SubVI (i.e., subprogram node), a LabVIEW function node, or a LabVIEW user interface terminal. There is also a specification of the inputs and outputs for the nodes. The "#" specifies which node terminal provides the primary signal output.

Referring again to FIG. 10, the script also includes a set of WIRE operations specifying how to interconnect the block diagram nodes created when the CREATE operations were performed. Translation information such as the sample above may be used in wiring the nodes together appropriately.

FIG. 12 illustrates the same LabVIEW block diagram as the block diagram of FIG. 11. As illustrated in FIG. 12 and described above, the loop among the "Sum", "Derivative", and "Integrator1" nodes of the Simulink program is implemented in the LabVIEW program through the use of a LabVIEW local variable, such that there is no loop per se in the LabVIEW program. However, the LabVIEW block diagram nodes may be generated with the positioning shown in FIG. 11 by default, so that the LabVIEW block diagram more closely resembles the Simulink block diagram.

Figure 13:
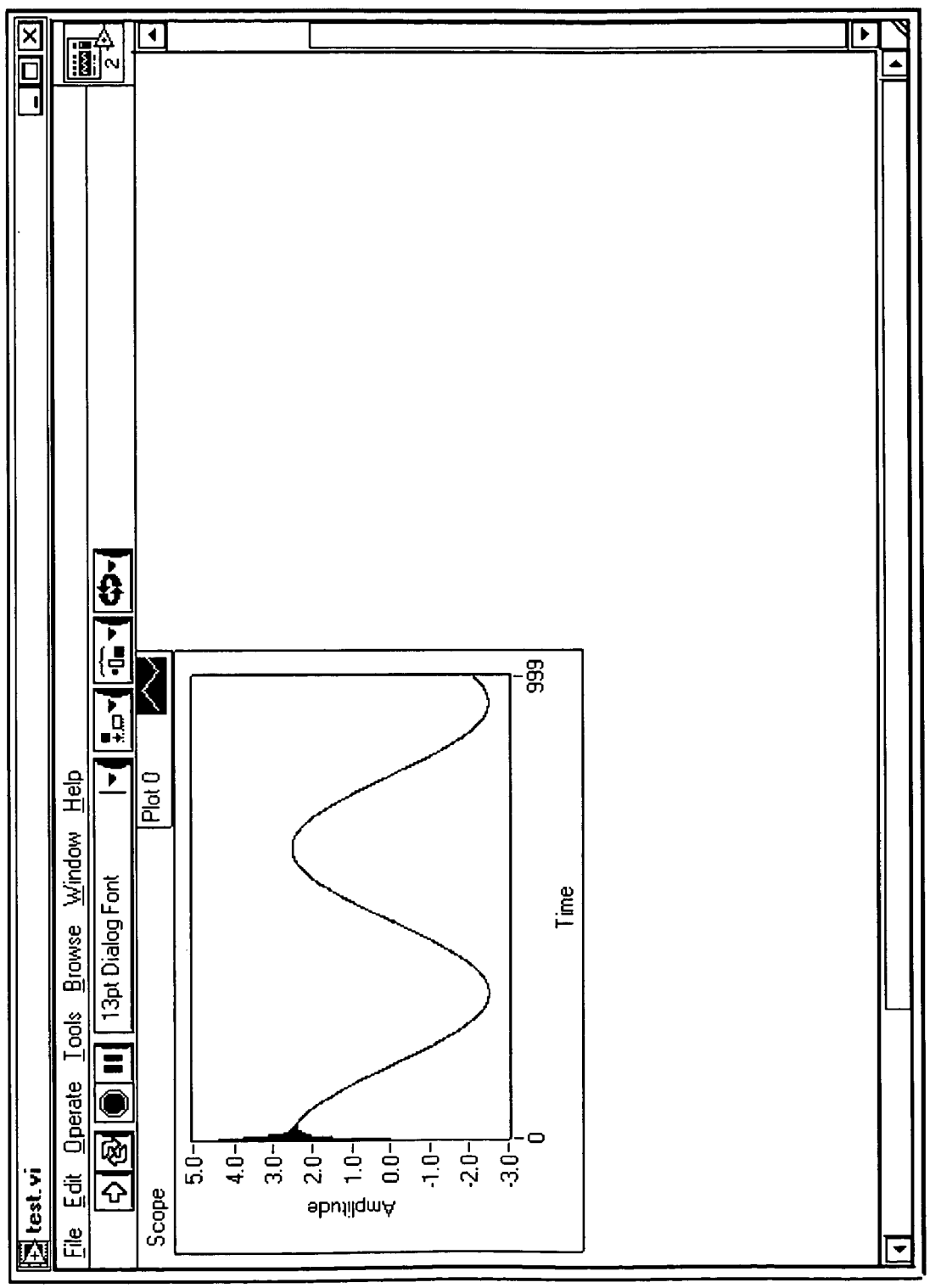
FIG. 13 illustrates a user interface panel corresponding to the LabVIEW block diagram of FIG. 11, which was automatically generated when the LabVIEW graphical program was programmatically generated.

FIG. 13 illustrates a user interface panel automatically generated for the LabVIEW program when the LabVIEW program is programmatically generated. The user interface graph element shown in FIG. 13 corresponds to the node labeled "Scope" in the LabVIEW block diagram of FIG. 11. This "Scope" node in the LabVIEW block diagram corresponds to the "Scope" node in the Simulink block diagram of FIG. 7. When the GPG program performs the CREATE operation for the Simulink "Scope" node, then the LabVIEW "Scope" node may be included in the LabVIEW block diagram, which is a LabVIEW user interface node terminal. As a result of creating this node terminal in the LabVIEW block diagram, the corresponding user interface graph element may be created in the LabVIEW user interface panel.

When executed, the programmatically generated LabVIEW graphical program of FIG. 11 performs substantially the same as the Simulink graphical program of FIG. 7. The LabVIEW graphical program may be executed in any computing environment supported by the LabVIEW programming development environment. LabVIEW provides support to download LabVIEW programs to hardware devices such as FPGA's and other programmable logic devices, e.g., for execution in an embedded system. Thus, in one embodiment, a Simulink program may be automatically converted to a LabVIEW program and may be downloaded to a hardware device supported by the LabVIEW programming development environment.

Programmatically Generating the Second Graphical Program

A graphical program generation (GPG) program may generate the second graphical program in any of various ways. In one embodiment, the GPG program may be implemented as a self-contained program or application that includes all necessary program logic for generating the second graphical program. In another embodiment, the GPG program may comprise a client portion and a server portion (or client program and server program), wherein the client portion may request or direct the server portion to generate the graphical program. For example, the client portion may utilize an application programming interface (API) provided by the server portion in order to generate the graphical program. In other words, the client portion may perform calls to the API provided by the server portion, and the server portion may execute functions or routines bound to these calls to generate the second graphical program. In one embodiment, the server portion may be an instance of the second graphical programming development environment or may be an application associated with the second graphical programming development environment. For example, the LabVIEW graphical programming development environment application enables client programs to interface with a LabVIEW server in order to programmatically generate or modify LabVIEW graphical programs.

As used herein, the term "GPG program" is intended to include any of various implementations of a program (or programs) that are executable to programmatically generate a graphical program. For example, the term "GPG program" is intended to include an embodiment in which the GPG program is a self-contained program or application (not implemented as a client/server program) that includes all necessary program logic for programmatically generating a second graphical program based on a first graphical program. The term "GPG program" is also intended to include an embodiment in which a combination of a client portion (or client program) and server portion (or server program) operate together to programmatically generate the second graphical program. The term "GPG program" is also intended to include other program implementations.

As described above, the GPG client program may communicate with a GPG server program through an API. The server program is operable to perform the actions indicated by the API calls. For example, the server program may be operable to create a new graphical program, add objects to the graphical program, connect graphical program objects, etc.

The GPG client program may be any of various types of programs. For example, the GPG client program may itself be a graphical program and may include various block diagram nodes operable to call a server program to create the second graphical program. FIGS. 14-19 illustrate portions of a client GPG graphical program. In other embodiments, the GPG client program may be a text-based program such as a C++ program, a Visual Basic program, a Java program, etc., or any combination of these or other languages.

As noted above, in one embodiment, the server program is an application instance of the LabVIEW graphical programming development environment. The LabVIEW environment comprises functionality referred to as "VI (virtual instrument) Server" which enables client programs to communicate with the LabVIEW environment. The VI Server functionality enables client programs to create or edit a LabVIEW graphical program or VI. A client program which requests LabVIEW to generate/edit a VI may itself be a graphical program or VI. A client VI may include particular nodes in the client VI block diagram which utilize the VI Server functionality of a LabVIEW instance to request the LabVIEW instance to create a new VI, add objects to the VI, etc. FIGS. 14-19, described below, illustrate one example of the use of such nodes to programmatically generate a second graphical program. (LabVIEW also provides components such as ActiveX components which enable text-based programs such as Visual Basic programs, Visual C++ programs, etc., to access the VI Server functionality.)

For more information on one embodiment of a system and method enabling the programmatic generation of a graphical program, please refer to U.S. patent application Ser. No. 09/745,023, titled, "System and Method for Programmatically Generating a Graphical Program in Response to Program Information", which was incorporated by reference above.

FIGS. 14-19—Graphical GPG Program

FIGS. 14-19 illustrate portions of a GPG client program operable to translate a Simulink graphical program to a LabVIEW graphical program, wherein the GPG client program is itself a graphical program.

Figure 14:
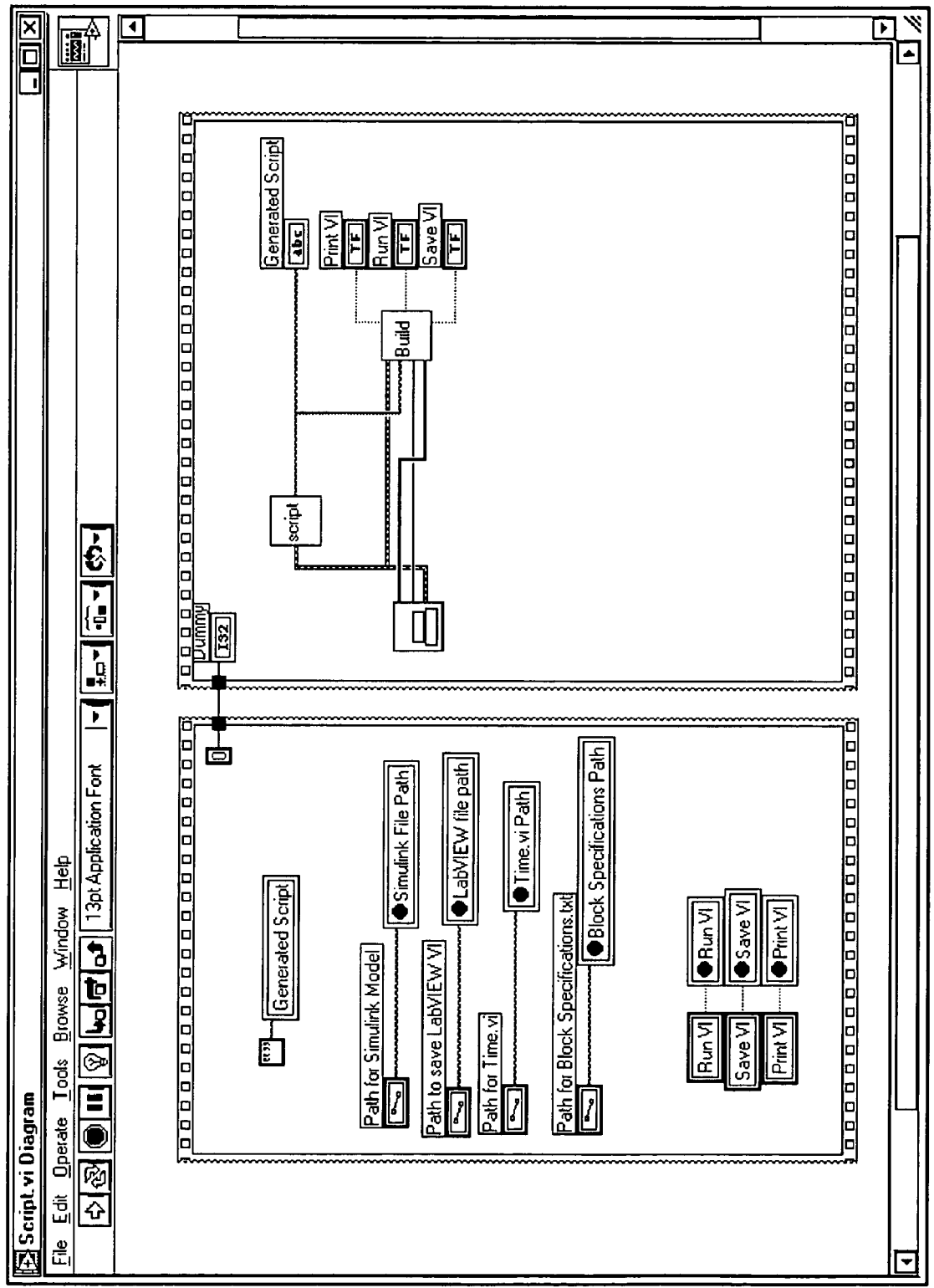
FIGS. 14-19 illustrate portions of a graphical program generation (GPG) program operable to translate a Simulink graphical program to a LabVIEW graphical program, wherein the GPG program is itself a graphical program.

In FIG. 14, the GPG client program portion obtains user input such as path names for a model file for the Simulink program to be translated and the LabVIEW program to be generated and then executes three subprograms, which respectively analyze the Simulink model file to create a directed graph representation, create a script file specifying creation of the LabVIEW program, and perform the operations specified in the script file. Also, once the LabVIEW program is generated, it may be executed, printed, or saved, depending on specified user input.

Figure 15:
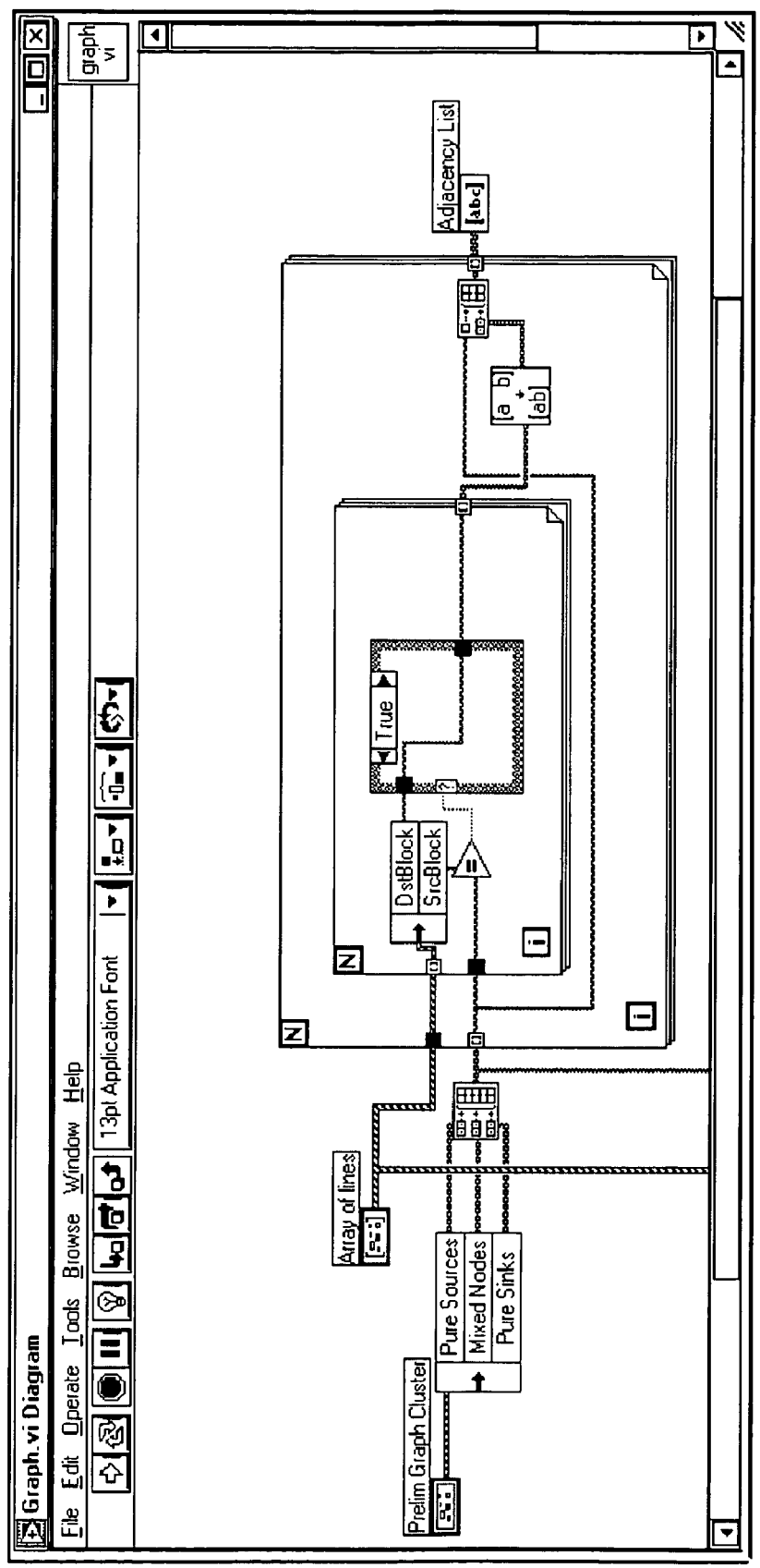

FIG. 15 illustrates a portion of the GPG client program to analyze the Simulink model file and construct the directed graph representation. This portion of the GPG program implements the method of FIG. 6.

Figure 16:
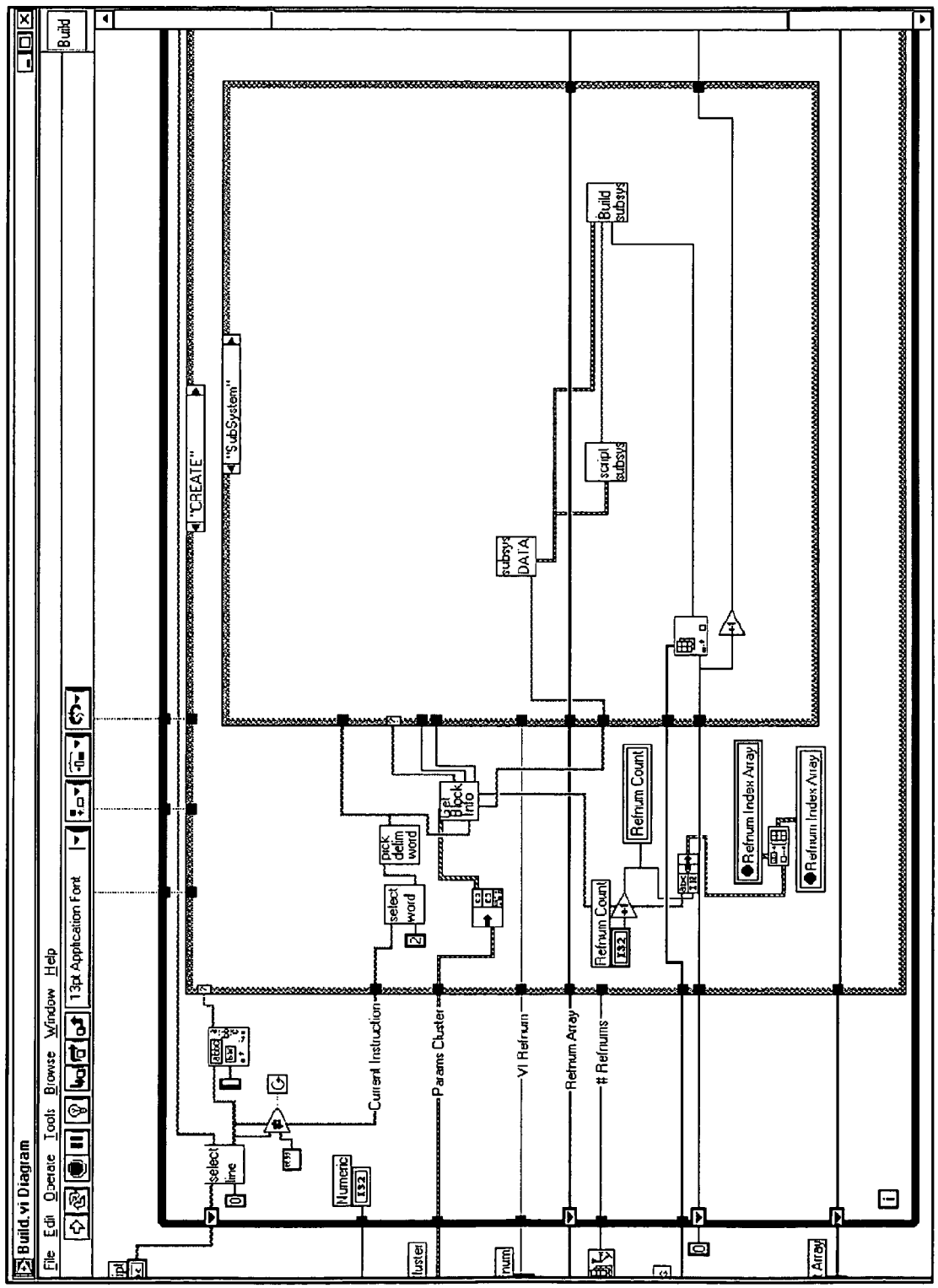

FIG. 16 illustrates a portion of the GPG client program to implement a CREATE script operation to create a properly configured LabVIEW block diagram node. For each type of node to be created, this portion of the GPG client program may implement separate cases (not shown).

Figure 17:
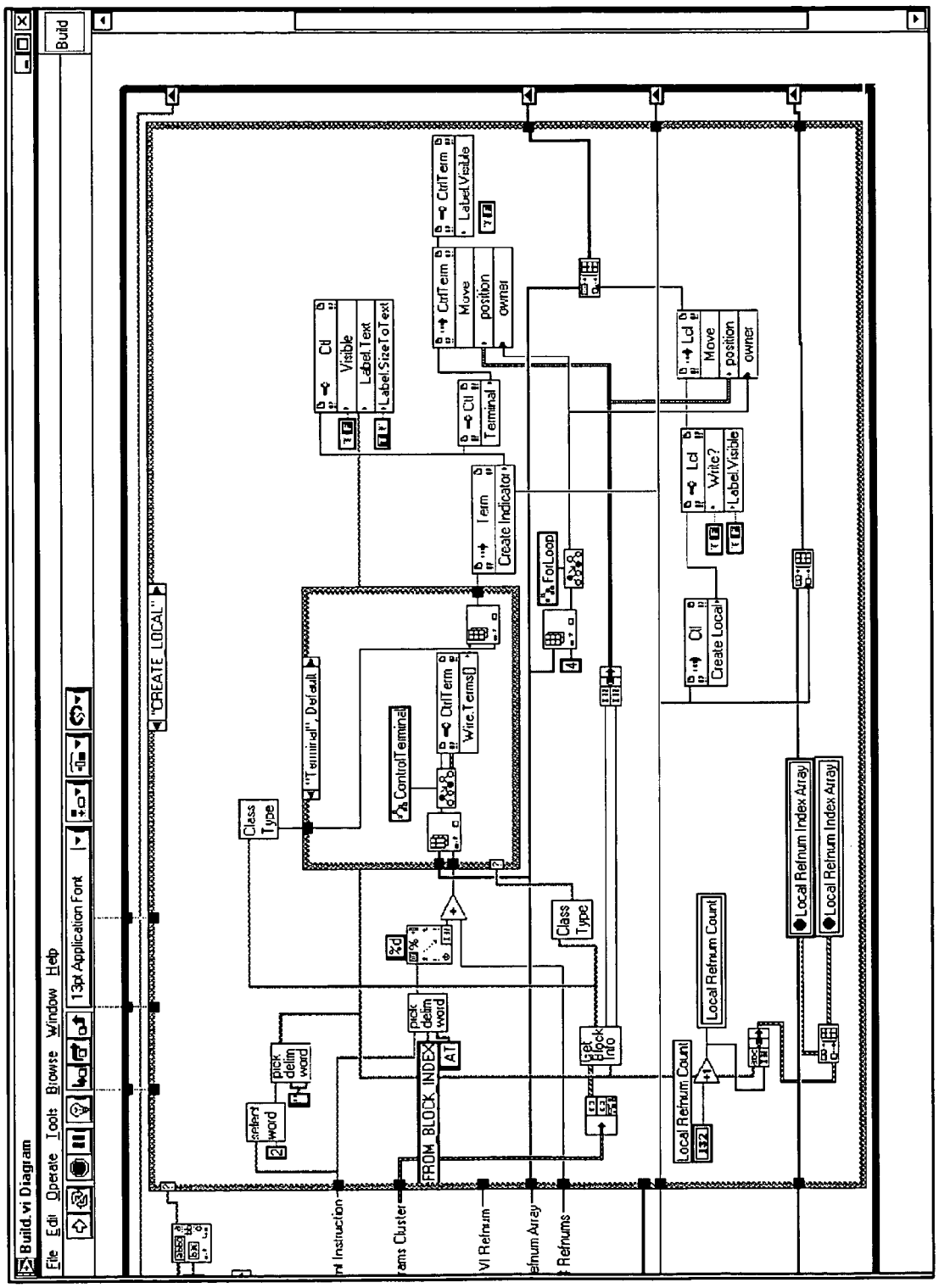

FIG. 17 illustrates a portion of the GPG client program to implement a CREATE_LOCAL script operation, e.g., to avoid a loop in the LabVIEW program through the use of a local variable node, as described above.

Figure 18:
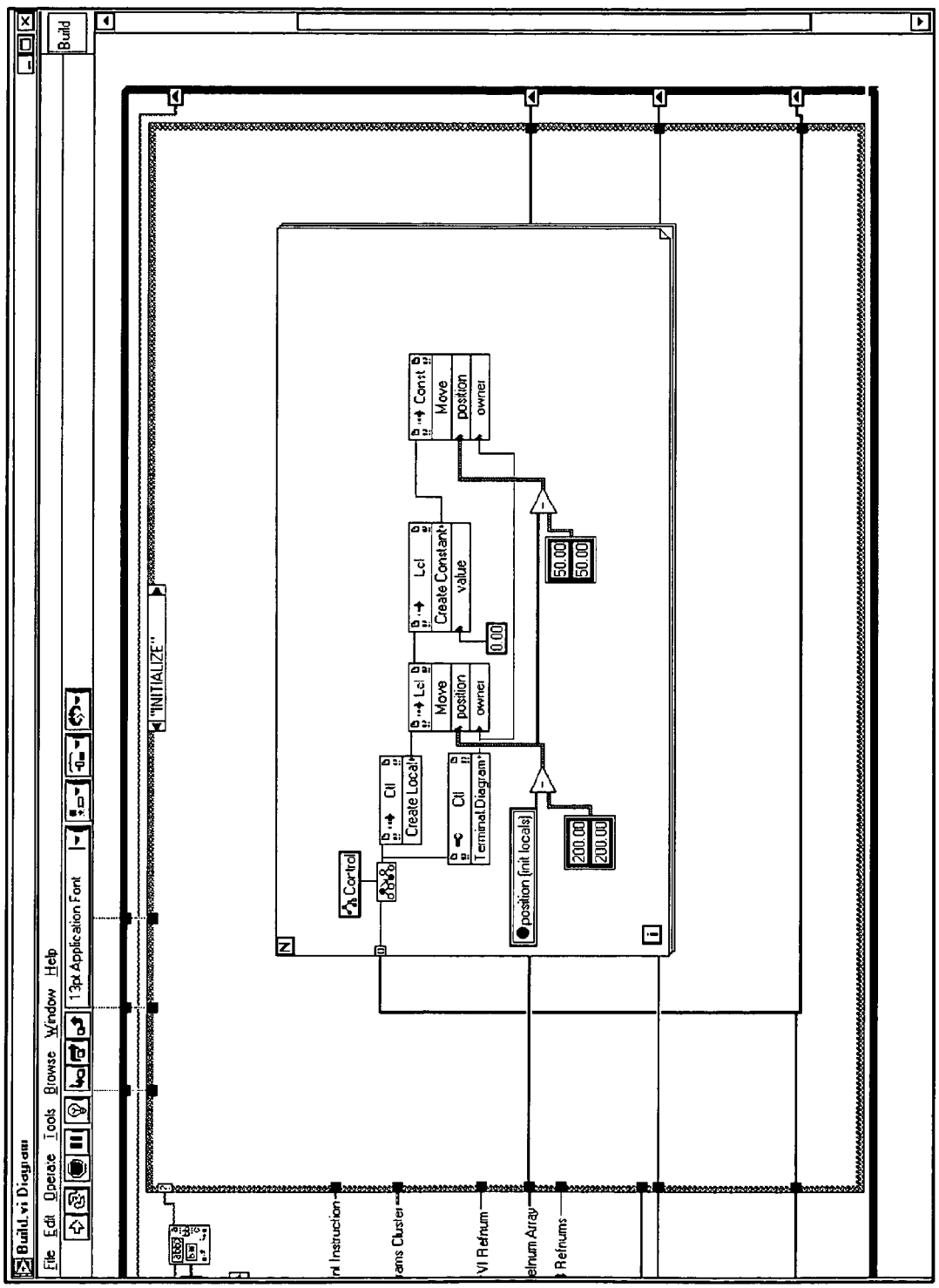

FIG. 18 illustrates a portion of the GPG client program to implement an INITIALIZE_LOCALS script operation to initialize local variable values so that the LabVIEW program executes correctly across multiple executions.

Figure 19:
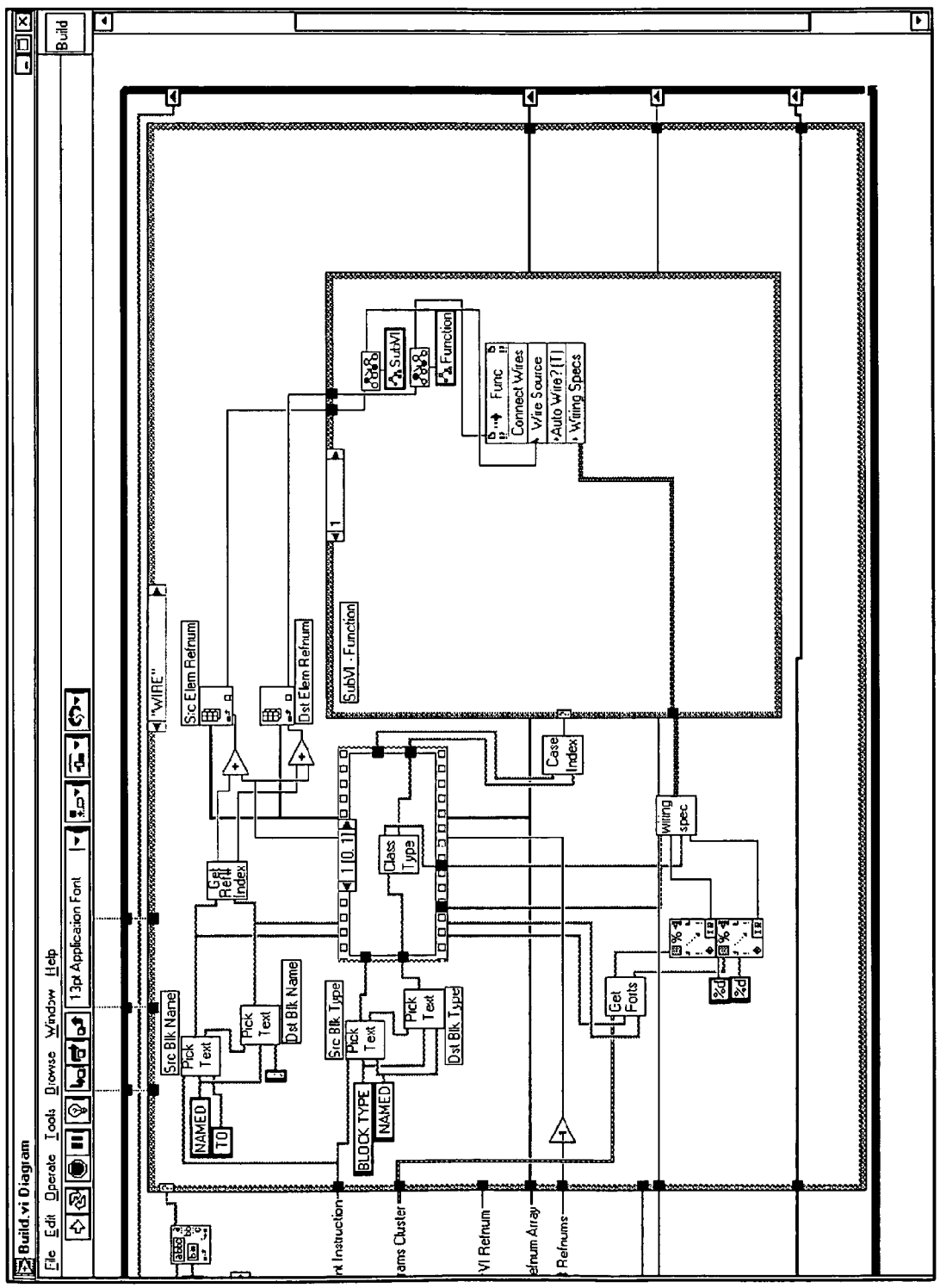

FIG. 19 illustrates a portion of the GPG client program to implement a WIRE script operation to connect two LabVIEW block diagram nodes.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A memory medium for automatically generating a second graphical program based on an abstract representation of a first graphical program, the memory medium comprising program instructions executable by a processor to:
store the abstract representation, wherein the abstract representation was created based on the first graphical program which includes a first plurality of interconnected nodes which specify a first functionality, and wherein the first graphical program is associated with a first programming development environment;
automatically generate the second graphical program based on the abstract representation, wherein the second graphical program implements the first functionality, wherein the second graphical program includes a second plurality of interconnected nodes which specify the first functionality, wherein the second graphical program is associated with a second programming development environment, and wherein the second programming development environment is different from the first programming development environment;
wherein said automatically generating the second graphical program is performed without direct user input specifying the second graphical program.

2. The memory medium of claim 1, wherein the abstract representation comprises a directed graph.

3. The memory medium of claim 1, wherein the abstract representation comprises an adjacency list representing data flow among the first plurality of nodes.

4. The memory medium of claim 1, wherein the abstract representation comprises coordinates for at least a subset of the first plurality of interconnected nodes.

5. The memory medium of claim 1, wherein the abstract representation comprises a representation of a user interface of the first graphical program.

6. The memory medium of claim 1, wherein the program instructions are further executable to:
modify the abstract representation, wherein said modifying comprises removing one or more nodes or connections specified by the first graphical program.

7. The memory medium of claim 6, wherein said modifying the abstract representation comprises adding one or more other nodes or connections to specify the functionality of the one or more nodes or connections specified by the first graphical program.

8. The memory medium of claim 1, wherein the program instructions are further executable to:
modify the abstract representation, wherein said modifying the abstract representation comprises performing one or more optimizations to facilitate downloading the second graphical program to a hardware device.

9. The memory medium of claim 1, wherein the program instructions are further executable to:
modify the abstract representation, wherein said modifying the abstract representation comprises performing one or more optimizations to increase parallelism from the first graphical program.

10. The memory medium of claim 1,
wherein the second graphical program implements only a portion of the first functionality.

11. The memory medium of claim 1,
wherein the first graphical program is one of a Simulink program, a VEE program, or a LabVIEW program.

12. The memory medium of claim 1,
wherein the second graphical program is one of a Simulink program, a VEE program, or a LabVIEW program.

13. The memory medium of claim 1,
wherein the first graphical program is a data flow diagram.

14. The memory medium of claim 1,
wherein the second graphical program is a data flow diagram.

15. The memory medium of claim 1,
wherein the first graphical program is a first type of data flow diagram; and
wherein the second graphical program is a second type of data flow diagram.

16. The memory medium of claim 1,
wherein the first graphical program is a model.

17. The memory medium of claim 1,
wherein the second graphical program is a model.

18. The memory medium of claim 1,
wherein the first graphical program is a first type of model; and
wherein the second graphical program is a second type of model.

19. A method for automatically generating a second graphical program based on an abstract representation of a first graphical program, comprising:
storing the abstract representation, wherein the abstract representation was created based on the first graphical program which includes a first plurality of interconnected nodes which specify a first functionality, and wherein the first graphical program is associated with a first programming development environment;

automatically generating the second graphical program based on the abstract representation, wherein the second graphical program implements the first functionality, wherein the second graphical program includes a second plurality of interconnected nodes which specify the first functionality, wherein the second graphical program is associated with a second programming development environment, and wherein the second programming development environment is different from the first programming development environment;

wherein said automatically generating the second graphical program is performed without direct user input specifying the second graphical program.

20. The method of claim 19, wherein the abstract representation comprises a directed graph.

21. The method of claim 19, wherein the abstract representation comprises an adjacency list representing data flow among the first plurality of nodes.

22. The method of claim 19, wherein the abstract representation comprises coordinates for at least a subset of the first plurality of interconnected nodes.

23. The method of claim 19, wherein the abstract representation comprises a representation of a user interface of the first graphical program.

24. The method of claim 19, further comprising:
modifying the abstract representation, wherein said modifying comprises removing one or more nodes or connections specified by the first graphical program.

25. The method of claim 19, wherein said modifying the abstract representation comprises adding one or more other nodes or connections to specify the functionality of the one or more nodes or connections specified by the first graphical program.

26. The method of claim 19, further comprising:
modifying the abstract representation, wherein said modifying the abstract representation comprises performing one or more optimizations to facilitate downloading the second graphical program to a hardware device.

27. The method of claim 19, further comprising:
modifying the abstract representation, wherein said modifying the abstract representation comprises performing one or more optimizations to increase parallelism from the first graphical program.

28. The method of claim 19,
wherein the second graphical program implements only a portion of the first functionality.

29. The method of claim 19,
wherein the first graphical program is one of a Simulink program, a VEE program, or a LabVIEW program.

30. The method of claim 19,
wherein the second graphical program is one of a Simulink program, a VEE program, or a LabVIEW program.

31. The method of claim 19,
wherein the first graphical program is a data flow diagram.

32. The method of claim 19,
wherein the second graphical program is a data flow diagram.

33. The method of claim 19,
wherein the first graphical program is a first type of data flow diagram; and
wherein the second graphical program is a second type of data flow diagram.

34. The method of claim 19,
wherein the first graphical program is a model.

35. The method of claim 19,
wherein the second graphical program is a model.

36. The method of claim 19,
wherein the first graphical program is a first type of model; and
wherein the second graphical program is a second type of model.

37. A system, comprising:
a processor; and
a memory medium coupled to the processor, wherein the memory medium stores program instructions for automatically generating a second graphical program based on a first graphical program, wherein the program instructions are executable to:
store the abstract representation, wherein the abstract representation was created based on the first graphical program which includes a first plurality of interconnected nodes which specify a first functionality, and wherein the first graphical program is associated with a first programming development environment;
automatically generate the second graphical program based on the abstract representation, wherein the second graphical program implements the first functionality, wherein the second graphical program includes a second plurality of interconnected nodes which specify the first functionality, wherein the second graphical program is associated with a second programming development environment, and wherein the second programming development environment is different from the first programming development environment;
wherein said automatically generating the second graphical program is performed without direct user input specifying the second graphical program.

38. A system, comprising:
means for storing the abstract representation, wherein the abstract representation was created based on a first graphical program which includes a first plurality of interconnected nodes which specify a first functionality, and wherein the first graphical program is associated with a first programming development environment;
means for automatically generating a second graphical program based on the abstract representation, wherein the second graphical program implements the first functionality, wherein the second graphical program includes a second plurality of interconnected nodes which specify the first functionality, wherein the second graphical program is associated with a second programming development environment, and wherein the second programming development environment is different from the first programming development environment;
wherein said automatically generating the second graphical program is performed without direct user input specifying the second graphical program.

39. A memory medium for automatically generating a second model based on an abstract representation of a first model, the memory medium comprising program instructions executable by a processor to:
store the abstract representation, wherein the abstract representation was created based on the first model which includes a first plurality of interconnected nodes which specify a first functionality, and wherein the first model is of a first programming model;
automatically generate the second model based on the abstract representation, wherein the second graphical program implements the first functionality, wherein the second model includes a second plurality of interconnected nodes which specify the first functionality, wherein the second model is of a second programming model, and wherein the second programming model is different from the first programming model;
wherein said automatically generating the second model is performed without direct user input specifying the second model.

40. The memory medium of claim 39, wherein the abstract representation comprises a directed graph.

41. The memory medium of claim 39, wherein the abstract representation comprises an adjacency list representing data flow among the first plurality of nodes.

42. The memory medium of claim 39, wherein the abstract representation comprises coordinates for at least a subset of the first plurality of interconnected nodes.

43. A memory medium for creating an abstract representation based on a first graphical program, the memory medium comprising program instructions executable by a processor to:
receive first information specifying the first graphical program, wherein the first graphical program includes a first plurality of interconnected nodes which specify a first functionality, and wherein the first graphical program is associated with a first programming development environment;
create the abstract representation based on the first information specifying the first graphical program, wherein the abstract representation is useable to create a second graphical program that is associated with a second different programming development environment, wherein the second graphical program implements the first functionality;
wherein in creating the abstract representation based on the first information specifying the first graphical program, the program instructions are executable to modify the abstract representation relating to one or more nodes or connections specified by the first information, wherein the program instructions are executable to modify the abstract representation to facilitate creation of the second graphical program associated with the second different programming development environment.

44. The memory medium of claim 43, wherein in creating the abstract representation based on the first information specifying the first graphical program, the program instructions are executable to remove one or more nodes or connections specified by the first information.

45. The memory medium of claim 43, wherein in creating the abstract representation based on the first information specifying the first graphical program, the program instructions are executable to add one or more other nodes or connections to the abstract representation.

46. The memory medium of claim 43, wherein in creating the abstract representation based on the first information specifying the first graphical program, the program instructions are executable to perform one or more optimizations to facilitate downloading the second graphical program to a hardware device.

47. The memory medium of claim 43, wherein in creating the abstract representation based on the first information specifying the first graphical program, the program instructions are executable to perform one or more optimizations to the abstract representation to increase parallelism from the first graphical program.

48. The memory medium of claim 43, wherein the abstract representation comprises a directed graph.

49. The memory medium of claim 43, wherein the abstract representation comprises an adjacency list representing data flow among the first plurality of nodes.

50. The memory medium of claim 43, wherein the abstract representation comprises coordinates for at least a subset of the first plurality of interconnected nodes.

51. The memory medium of claim 43, wherein the abstract representation comprises a representation of a user interface of the first graphical program.

52. The memory medium of claim 43,
wherein the first graphical program includes a first block diagram and a first user interface.

53. The memory medium of claim 43,
wherein the first graphical program is one of a Simulink program, a VEE program, or a LabVIEW program.

54. The memory medium of claim 43,
wherein the second graphical program is one of a Simulink program, a VEE program, or a LabVIEW program.

55. The memory medium of claim 43,
wherein the first graphical program is a data flow diagram.

56. The memory medium of claim 43,
wherein the second graphical program is a data flow diagram.

57. The memory medium of claim 43,
wherein the first graphical program is a first type of data flow diagram; and
wherein the second graphical program is a second type of data flow diagram.

58. The memory medium of claim 43,
wherein the first graphical program is a model.

59. The memory medium of claim 43,
wherein the second graphical program is a model.

60. The memory medium of claim 43,
wherein the first graphical program is a first type of model; and
wherein the second graphical program is a second type of model.

61. A method for creating an abstract representation based on a first graphical program, the method comprising:
receiving, by a computer system, first information specifying the first graphical program, wherein the first graphical program includes a first plurality of interconnected nodes which specify a first functionality, and wherein the first graphical program is associated with a first programming development environment;
creating, by the computer system, the abstract representation based on the first information specifying the first graphical program, wherein the abstract representation is useable to create a second graphical program that is associated with a second different programming development environment, wherein the second graphical program implements the first functionality;
wherein said creating the abstract representation comprises modifying the abstract representation relating to one or more nodes or connections specified by the first information, wherein said modifying the abstract representation is performed to facilitate creation of the second graphical program associated with the second different programming development environment.
wherein said creating the abstract representation comprises storing the abstract representation in a memory.

62. The method of claim 61, wherein said creating the abstract representation comprises removing one or more nodes or connections specified by the first information.

63. The method of claim 61, wherein said creating the abstract representation comprises adding one or more other nodes or connections to the abstract representation.

64. The method of claim 61, wherein said creating the abstract representation comprises performing one or more optimizations to facilitate downloading the second graphical program to a hardware device.

65. The method of claim 61, wherein said creating the abstract representation comprises performing one or more optimizations to the abstract representation to increase parallelism from the first graphical program.

66. The method of claim 61, wherein the abstract representation comprises a directed graph.

67. The method of claim 61, wherein the abstract representation comprises an adjacency list representing data flow among the first plurality of nodes.

68. The method of claim 61, wherein the abstract representation comprises coordinates for at least a subset of the first plurality of interconnected nodes.

69. The method of claim 61, wherein the abstract representation comprises a representation of a user interface of the first graphical program.

70. The method of claim 61,
wherein the first graphical program is one of a Simulink program, a VEE program, or a LabVIEW program.

71. The method of claim 61,
wherein the second graphical program is one of a Simulink program, a VEE program, or a LabVIEW program.

72. The method of claim 61,
wherein the first graphical program is a data flow diagram.

73. The method of claim 61,
wherein the second graphical program is a data flow diagram.

74. The method of claim 61,
wherein the first graphical program is a first type of data flow diagram; and
wherein the second graphical program is a second type of data flow diagram.

75. The method of claim 61,
wherein the first graphical program is a model.

76. The method of claim 61,
wherein the second graphical program is a model.

77. The method of claim 61,
wherein the first graphical program is a first type of model; and
wherein the second graphical program is a second type of model.

78. A system, comprising:
a processor; and
a memory medium coupled to the processor, wherein the memory medium stores program instructions for creating an abstract representation based on a first graphical program, wherein the program instructions are executable to:
receive first information specifying the first graphical program, wherein the first graphical program includes a first plurality of interconnected nodes which specify a first functionality, and wherein the first graphical program is associated with a first programming development environment;
create the abstract representation based on the first information specifying the first graphical program, wherein the abstract representation is useable to create a second graphical program that is associated with a second different programming development environment, wherein the second graphical program implements the first functionality;
wherein in creating the abstract representation based on the first information specifying the first graphical program, the program instructions are executable to modify the abstract representation relating to one or more nodes or connections specified by the first information, wherein the program instructions are executable to modify the abstract representation to facilitate creation of the second graphical program associated with the second different programming development environment.

79. A system, comprising:
means for receiving information specifying a first graphical program, wherein the first graphical program includes a first plurality of interconnected nodes which specify a first functionality, and wherein the first graphical program is associated with a first programming development environment;
means for creating an abstract representation based on the information specifying the first graphical program, wherein the abstract representation is useable to create a second graphical program that is associated with a second different programming development environment, wherein the second graphical program implements the first functionality;
wherein the means for creating comprises a means for modifying the abstract representation relating to one or more nodes or connections specified by the first information, wherein the means for modifying is configured to modify the abstract representation to facilitate creation of the second graphical program associated with the second different programming development environment.

80. A memory medium comprising program instructions for creating an abstract representation based on a first model, wherein the program instructions are executable by a processor to:
receive first information specifying the first model, wherein the first model includes a first plurality of interconnected nodes which specify a first functionality, and wherein the first model is of a first programming model;
create the abstract representation based on the first information specifying the first model, wherein the abstract representation is useable to create a second model of a second programming model, wherein the second model implements the first functionality;
wherein in creating the abstract representation based on the first information specifying the first model, the program instructions are executable to modify the abstract representation relating to one or more nodes or connections specified by the first information, wherein the program instructions are executable to modify the abstract representation to facilitate creation of the second model of the second programming model.

81. The memory medium of claim 80, wherein in creating the abstract representation based on the first information specifying the first model, the program instructions are executable to remove one or more nodes or connections specified by the first information.

82. The memory medium of claim 80, wherein in creating the abstract representation based on the first information specifying the first model, the program instructions are executable to add one or more other nodes or connections to the abstract representation.

83. The memory medium of claim 80, wherein in creating the abstract representation based on the first information specifying the first model, the program instructions are executable to perform one or more optimizations to facilitate downloading the second graphical program to a hardware device.

84. The memory medium of claim 80, wherein in creating the abstract representation based on the first information specifying the first model, the program instructions are executable to perform one or more optimizations to the abstract representation to increase parallelism from the first model.

85. A memory medium for automatically generating a second graphical program based on an abstract representation of a first graphical program, the memory medium comprising program instructions executable by a processor to:
store the abstract representation, wherein the abstract representation was created based on the first graphical program which includes a first plurality of interconnected nodes which specify a first functionality, and wherein the first graphical program is of a first programming model;
automatically generate the second graphical program based on the abstract representation, wherein the second graphical program implements the first functionality, wherein the second graphical program includes a second plurality of interconnected nodes which specify the first functionality, wherein the second graphical program is of a second programming model, and wherein the second programming model is different from the first programming model;
wherein said automatically generating the second graphical program is performed without direct user input specifying the second graphical program.

86. A memory medium for creating an abstract representation based on a first graphical program, the memory medium comprising program instructions executable by a processor to:
receive first information specifying the first graphical program, wherein the first graphical program includes a first plurality of interconnected nodes which specify a first functionality, and wherein the first graphical program is of a first programming model;
create the abstract representation based on the first information specifying the first graphical program, wherein the abstract representation is useable to create a second graphical program that is of a second different programming model, wherein the second graphical program implements the first functionality;
wherein in creating the abstract representation based on the first information specifying the first graphical program, the program instructions are executable to modify the abstract representation relating to one or more nodes or connections specified by the first information, wherein the program instructions are executable to modify the abstract representation to facilitate creation of the second graphical program of the second different programming model.

* * * * *